(12) United States Patent
Donlan et al.

(10) Patent No.: US 10,965,482 B2
(45) Date of Patent: *Mar. 30, 2021

(54) BUILDING MANAGEMENT SYSTEM THAT DETERMINES BUILDING UTILIZATION

(71) Applicant: Crestron Electronics, Inc., Rockleigh, NJ (US)

(72) Inventors: Brian Donlan, Edgewater, NJ (US); Daniel Jackson, Norwood, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/354,874

(22) Filed: Mar. 15, 2019

(65) Prior Publication Data

US 2019/0215177 A1 Jul. 11, 2019

Related U.S. Application Data

(63) Continuation of application No. 15/332,241, filed on Oct. 24, 2016, now Pat. No. 10,298,411.

(51) Int. Cl.
*H04L 12/28* (2006.01)
*G06F 16/28* (2019.01)
(Continued)

(52) U.S. Cl.
CPC ...... *H04L 12/2803* (2013.01); *G06F 16/2228* (2019.01); *G06F 16/248* (2019.01);
(Continued)

(58) Field of Classification Search
CPC ............. G06F 16/285; G06F 16/2228; G06F 16/24575; G06F 16/9535; G06F 16/248; H04L 12/2803

(Continued)

(56) References Cited

U.S. PATENT DOCUMENTS

| 9,958,291 | B1 * | 5/2018 | Shunturov | ............ H04L 67/125 |
| 2007/0176760 | A1 * | 8/2007 | Reeves | .................. G08B 21/04 340/426.22 |

(Continued)

*Primary Examiner* — Mark E Hershley
(74) *Attorney, Agent, or Firm* — Crestron Electronics, Inc.

(57) ABSTRACT

A building management system and method that determines space utilization in a building. The building management system comprises room utilization sensors, such as occupancy sensors, a gateway that gathers raw occupancy data records from the occupancy sensors, and at least one processor. Each raw occupancy data record comprises an occupancy state associated with a timestamp. The processor is configured for normalizing the raw occupancy data records into normalized occupancy data records each comprising a time segment and an occupancy state indicating whether for a given time segment a room is occupied. The processor is further configured for structuring the normalized occupancy data records by associating each normalized occupancy data record with a space node corresponding to a room in the building from where the raw occupancy data record was collected and associating each space node with a set of tags, each tag defining a single state from a plurality of states. The processor may further receive a selection of a tag from a user interface, split the normalized occupancy data records along the selected tag's states into sets of normalized occupancy data records, for each split set of occupancy data records, calculate at least one occupancy rate, and display a visualization of space utilization of the building comprising a comparison of the occupancy rates of the selected tag's states.

20 Claims, 17 Drawing Sheets

(51) Int. Cl.
　　　*G06F 16/9535*　　(2019.01)
　　　*G06F 16/22*　　　(2019.01)
　　　*G06F 16/2457*　　(2019.01)
　　　*G06F 16/248*　　 (2019.01)

(52) U.S. Cl.
　　　CPC ...... *G06F 16/24575* (2019.01); *G06F 16/285* (2019.01); *G06F 16/9535* (2019.01)

(58) Field of Classification Search
　　　USPC .......................................................... 707/722
　　　See application file for complete search history.

(56) References Cited

U.S. PATENT DOCUMENTS

| | | | |
|---|---|---|---|
| 2014/0058572 A1* | 2/2014 | Stein | H02J 13/00004 700/291 |
| 2015/0019714 A1* | 1/2015 | Shaashua | H04L 12/2818 709/224 |
| 2015/0051741 A1* | 2/2015 | Bruck | G05D 23/1902 700/276 |
| 2015/0256401 A1* | 9/2015 | Zinger | H04L 41/14 370/401 |
| 2017/0055126 A1* | 2/2017 | O'Keeffe | H04W 4/023 |
| 2018/0036448 A1* | 2/2018 | Becker | A61L 9/037 |
| 2018/0113897 A1* | 4/2018 | Donlan | G06F 16/9535 |
| 2019/0004550 A1* | 1/2019 | Borean | F24F 11/30 |

\* cited by examiner

FIG. 14

| Building Management System | 1401 | Analysis | Alerts | Setup | Help |

__1402__

Building 1 utilization of 24% below minimum of 65% [Explore] [Change Limit] [Ignore]

__1403__  Facility Room Utilization  [Add Alert]

Average Occupancy Rate by Hour  ↗ 1501

(chart: Average % of Rooms Utilized at a Time vs. Time of Day; series 101, 102, 103, 201, 203, 204, 205, 301, 302; label 1504)

1421 ↗ Overview: [All ▽]   Explore: [Occupancy ▽] ⌐1422

1424 ⌐ Explore Further - break down by:

NA

[Reset] ⌐1502

__1404__  Room List  1426  1427

| Room | Building | Location | Floor | Dep. | Access | Capacity | Purpose | | |
|---|---|---|---|---|---|---|---|---|---|
| 101 | Building 1 | Rockleigh, NJ | 1 | HR | Manager | 9 | VTC | [Show] | [Add Alert] |
| 102 | Building 1 | Rockleigh, NJ | 1 | HR | Open | 20 | VTC | [Show] | [Add Alert] |
| 103 | Building 1 | Rockleigh, NJ | 1 | Prod. | Open | 10 | ATC | [Show] | [Add Alert] |
| 201 | Building 1 | Rockleigh, NJ | 2 | Eng. | Manager | 8 | VTC | [Show] | [Add Alert] |
| 203 | Building 1 | Rockleigh, NJ | 2 | Eng. | Open | 10 | VTC | [Show] | [Add Alert] |

| Building Management System | 1401 | Analysis | Alerts | Setup | Help |

1402

Building 1 utilization of 24% below minimum of 65% | Explore | Change Limit | Ignore

1403          Facility Room Utilization        [Add Alert]

Average Occupancy Rate by Building — 1601

1602 (Bldg. 102, Bldg. 2, Bldg. 3)

1421 — Overview: [All ▽]     Explore: [Occupancy ▽] — 1422

1424 — Explore Further - break down by:

[Floor▽] [Department▽] [Room▽] [Capacity▽] [Access▽] [Purpose▽]
1206d   1206e   1206a —1432 / —1434   1206f   1206g   1206h

[Reset] — 1502

1404           Room List        1426   1427

| Room | Building | Location | Floor | Dep. | Access | Capacity | Purpose | | |
|---|---|---|---|---|---|---|---|---|---|
| 101 | Building 1 | Rockleigh, NJ | 1 | HR | Manager | 9 | VTC | Show | Add Alert |
| 102 | Building 1 | Rockleigh, NJ | 1 | HR | Open | 20 | VTC | Show | Add Alert |
| 103 | Building 1 | Rockleigh, NJ | 1 | Prod. | Open | 10 | ATC | Show | Add Alert |
| 201 | Building 1 | Rockleigh, NJ | 2 | Eng. | Manager | 8 | VTC | Show | Add Alert |
| 203 | Building 1 | Rockleigh, NJ | 2 | Eng. | Open | 10 | VTC | Show | Add Alert |

BUILDING MANAGEMENT SYSTEM THAT DETERMINES BUILDING UTILIZATION

BACKGROUND OF THE INVENTION

Technical Field

Aspects of the embodiments relate to a building management system, more specifically to systems, methods, and modes for determining building utilization for building control and management.

Background Art

Understanding building utilization is extremely valuable in enterprise management. It allows for efficient space and resource allocation without unnecessary expenditure on excess workspace, energy, operation, and maintenance. Yet, it is a continuous challenge as there are currently no good ways to identify if a workspace, such as a meeting space, is being used effectively. Facility and real estate managers design rooms and choose room capacity and equipment based on little more than a guess of what is needed. User complains is typically the only indication that there are not enough rooms (or rooms of a certain type). But these indications may be misleading as, for example, rooms may be overbooked while actual room utilization may be significantly lower.

The traditional way to formally measure meeting room usage has been to manually survey each room throughout the day with a clipboard. This method requires multiple people to dedicate multiple days to surveying rooms and can still be wildly inaccurate. Other services exist that monitor workspaces using occupancy sensors to measure how many people are present in a room. However, these services are only temporary studies that do not provide a holistic view and do not take into account equipment usage. They also only provide their results in a report at the end of the study and do not provide live monitoring.

Accordingly, a need has arisen for a building management system that effectively determines workspace utilization for building control and management.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for a building management system that will obviate or minimize problems of the type previously described.

It is also an aspect of the embodiments to provide systems, methods, and modes for determining building utilization for building control and management.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

Disclosure of Invention

According to a first aspect of the embodiments, a building management system that determines space utilization in a building is provided. The building management system comprises a plurality of room utilization sensors, one or more gateways, and at least one processor. The plurality of room utilization sensors may comprise occupancy sensors each configured for detecting an occupancy state in a room in a building. The one or more gateways may be configured for gathering raw occupancy data records from the occupancy sensors and storing the raw occupancy data records on a raw data database, wherein each raw occupancy data record comprises an occupancy state associated with a timestamp. The at least one processor may be configured for: (a) retrieving the raw occupancy data records from the raw data database; (b) normalizing the raw occupancy data records into normalized occupancy data records, wherein each normalized occupancy data record comprises a time segment and an occupancy state indicating whether for a given time segment a room is occupied; (c) structuring the normalized occupancy data records by associating each normalized occupancy data record with a space node corresponding to a room in the building from where the raw occupancy data record was collected; (d) associating each space node with a set of tags, each tag defining a single state from a plurality of states; (e) receiving a selection of a tag from a user interface; (f) splitting the normalized occupancy data records along the selected tag's states into sets of normalized occupancy data records; (g) for each split set of occupancy data records, calculating at least one occupancy rate; (h) displaying a visualization of space utilization of the building comprising a comparison of the occupancy rates of the selected tag's states.

According to one embodiment, the occupancy rates may comprise averages of the split sets of occupancy data records, wherein the visualization of space utilization of the building may comprise a bar graph comprising bars that compare the occupancy rates. The processor may be further configured for: (i) receiving a selection of a first bar from the user interface corresponding to a first set of normalized occupancy data records; (ii) receiving a selection of a second tag from the user interface; (iii) further splitting the first set of normalized occupancy data records along the selected second tag's states into subsets of normalized occupancy data records; (iv) for each split subset of occupancy data records, calculating at least one second occupancy rate; (v) displaying a second visualization of space utilization of the building comprising a comparison of the second occupancy rates of the selected second tag's states.

According to another embodiment, the occupancy rates may comprise changes of averages of the split sets of occupancy data records across time segments, wherein the visualization of space utilization of the building may comprise a line graph comprising lines that compare the occupancy rates over time. The processor may be further configured for: (i) receiving a selection of a first line from the user interface corresponding to a first set of normalized occupancy data records; (ii) receiving a selection of a second tag from the user interface; (iii) further splitting the first set of normalized occupancy data records along the selected second tag's states into subsets of normalized occupancy data records; (iv) for each split subset of occupancy data records, calculating at least one second occupancy rate; (v) displaying a second visualization of space utilization of the building comprising a comparison of the second occupancy rates of the selected second tag's states.

According to an embodiment, the raw occupancy data records may be normalized by determining for each given time segment whether a total amount of time a room was occupied during the given time segment exceeds a predetermined minimum occupancy threshold value. According to an embodiment, for each given time segment and for each given space node, the raw occupancy data records may be normalized by: (i) creating a normalized occupancy data record for the given time segment and given space node; (ii) retrieving raw occupancy data records associated with the given space node with timestamps falling between a start time and an end time of the given time segment; (iii) retrieving a last occupancy data record associated with the given space node from a previous time segment; (iv) determining time intervals during which occupancy states of the retrieved raw occupancy data records indicated that a room associated with the given space node was occupied during the given time segment; (v) adding the time intervals to determine the total time the room was occupied; (vi) determining whether the total time exceeds a minimum occupancy threshold; (vii) when the total time exceeds the minimum occupancy threshold, setting an occupancy state of the created normalized occupancy data record as occupied; and (viii) when the total time does not exceed the minimum occupancy threshold, setting the occupancy state of the normalized occupancy data record for the given time segment and given space node as vacant.

According to an embodiment, each space node may be organized in a tree topology with a building node as the root and individual space nodes as children. According to an embodiment, the processor may comprise an alerts engine configured for issuing alerts when calculated occupancy rates exceed a minimum value or a maximum value.

According to an embodiment, the set of tags may comprise one of a room name tag, a campus tag, a location tag, a building name tag, a floor tag, a department tag, a team tag, a room capacity tag, a room access level tag, an available resource tag, a purpose tag, or the line. The department tag may comprise department states each identifying a department. The capacity tag may comprise capacity states each identifying a maximum room capacity. The access level tag may comprise access level states each identifying employee access level to a room. The purpose tag may comprise purpose states each identifying a type of meeting that can be held in a room. The purpose states may comprise at least one of a presentation room state, an audioconference codec room state, and a videoconference codec room state.

According to an embodiment, the processor may further display a building overview gauge comprising a bar comprising an ideal measurement area, an acceptable measurement area, and an unwanted measurement area; a meter that shows on the bar an average occupancy rate of the entire building; a minimum arrow that shows a minimum average occupancy rate of a space node; and a maximum arrow that shows a maximum average occupancy rate of a space node. The bar may comprise a ring user interface element. The visualization of space utilization may further comprise a break down bar including names of one or more of the set of tags for selection by a user.

According to another aspect of the embodiments, the room utilization sensors may further comprise people count sensors each configured for counting people in a room in a building. The one or more gateways may be configured for gathering raw people count data records from the plurality of people count sensors and storing the raw people count data records on the raw data database, wherein each raw people count data record comprises a people count associated with a timestamp. The at least one processor may be configured for: (a) retrieving raw people count data records from the raw data database; (b) normalizing the raw people count data records into normalized people count data records, wherein each normalized people count data record comprises a time segment and a people count indicating the number of people present in a room during a given time segment; (c) structuring the normalized people count data records by associating each normalized people count data record with a space node corresponding to a room in the building from where the raw people count data record was collected; (d) associating each space node with a set of tags, each tag defining a single state from a plurality of states; (e) receiving a selection of a tag from a user interface; (f) splitting the normalized people count data records along the selected tag's states into sets of normalized people count data records; (g) for each split set of normalized people count data records, calculating at least one people count rate; and (h) displaying a visualization of space utilization of the building comprising a comparison of the people count rates of the selected tag's states.

According to an embodiment, the raw people count data records may be normalized by determining a peak number of people that were present in a room for a predetermined minimum amount of time during a given time segment. According to an embodiment, for each given time segment and for each given space node, the raw people count data records are normalized by: (a) creating a normalized people count data record for the given time segment and given space node; (b) retrieving raw people count data records associated with the given space node with timestamps falling between a start time and an end time of the given time segment; (c) retrieving a last people count data record associated with the given space node from a previous time segment; (d) comparing people counts of the retrieved raw people count data records and determining a peak people count indicating a peak number of people that were present in the room during the given time segment; (e) determining a time interval during which the people counts of the retrieved raw people count data records were equal to or exceeding the peak people count; (f) determining whether the time interval exceeds a minimum count threshold; (g) when the time interval exceeds the minimum count threshold, setting a people count of the created normalized people count record to the peak people count; (h) when the time interval does not exceed the minimum count threshold: i. decrementing the peak people count by one; ii. when the decremented peak count is not larger than zero, setting the people count of the created normalized people count record to zero; iii. when the decremented peak count is larger than zero, repeating steps (e) through (h).

According to another aspect of the embodiments, the building management system may comprise a calendar server and a plurality of electronic devices installed in the rooms of the building. The at least one processor may be configured for: (a) receiving raw device usage data records from the plurality of electronic devices, wherein each device usage record comprises device usage state associated with a timestamp; (b) retrieving room scheduling data records from the calendar server; (c) normalizing the raw device usage data records into normalized device usage data records, wherein each normalized device usage data record comprises a time segment and a device usage state indicating whether an electronic device was used during a time segment falling within a scheduled meeting; (d) structuring the normalized device usage data records by associating each device usage data record with a space node corresponding to a room in the building from where the raw device usage data was collected; (e) associating each space node with a set of tags, each tag defining a single state from a plurality of states; (f) receiving a selection of a tag from a user interface; (g) splitting the normalized device usage data records along the selected tag's states into sets of normalized device usage data records; (h); for each split set of normalized people count data records, calculating at least one device usage rate; and (i) displaying a visualization of space utilization of the building comprising a comparison of the device usage rates of the selected tag's states.

According to an embodiment, for each given space node, the raw device usage data is normalized by: (i) retrieving a scheduled meeting from the calendar server comprising a start time and an end time; (ii) retrieving device usage records with timestamps falling between the start time and end time of the scheduled meeting; (iii) determining whether at least one device usage record has been recorded during the scheduled meeting; (iv) when at least one device usage record has been recorded, for each time segment that falls between the start time and end time of the scheduled meeting, creating a normalized device usage data record and setting its device usage state to indicated that an electronic device has been used; (v) when no device usage record has been recorded, for each time segment that falls between the start time and end time of the scheduled meeting, creating a normalized device usage data record and setting its device usage state to indicated that an electronic device has not been used.

According to another aspect of the embodiments, a building management system is provided comprising a plurality of room utilization sensors, one or more gateways, and at least one processor. The room utilization sensors may comprise occupancy sensors each configured for detecting an occupancy state in a room in a building. The one or more gateways may be configured for: (i) gathering raw occupancy data records from the occupancy sensors, wherein each raw occupancy data record comprises an occupancy state associated with a timestamp; (ii) normalizing the raw occupancy data records into normalized occupancy data records, wherein each normalized occupancy data record comprises a time segment and an occupancy state indicating whether for a given time segment a room is occupied; and (iii) storing the raw occupancy data records on a database. The at least one processor may be configured for: (i) retrieving the normalized occupancy data records from the database; (ii) structuring the normalized occupancy data records by associating each normalized occupancy data record with a space node corresponding to a room in the building from where the raw occupancy data record was collected; (iii) associating each space node with a set of tags, each tag defining a single state from a plurality of states; (iv) receiving a selection of a tag from a user interface; (v) splitting the normalized occupancy data records along the selected tag's states into sets of normalized occupancy data records; (vi) for each split set of occupancy data records, calculating at least one occupancy rate; and (vii) displaying a visualization of space utilization of the building comprising a comparison of the occupancy rates of the selected tag's states.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1:
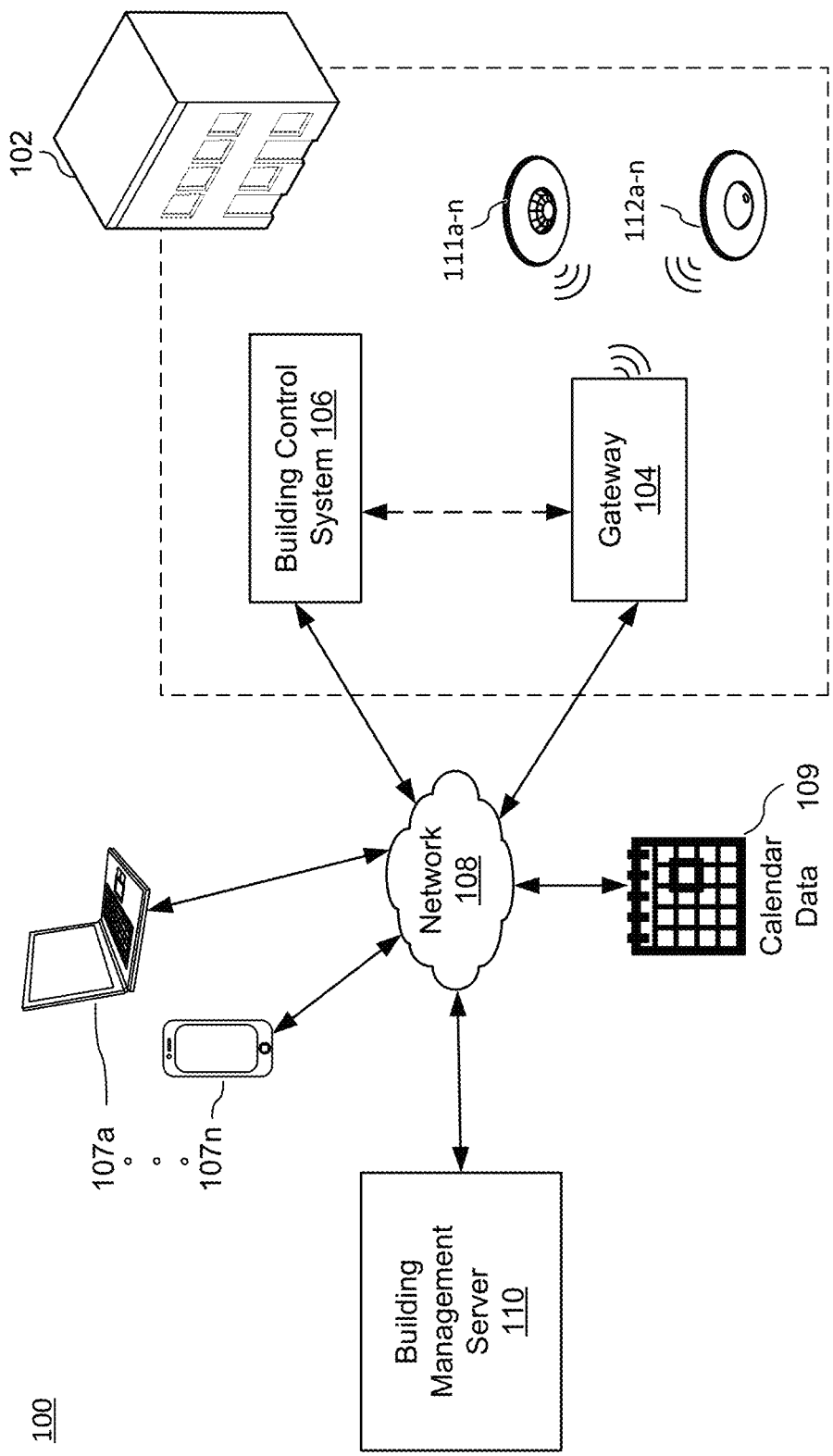

FIG. 1 illustrates a block diagram depicting a building management system for managing one or more buildings according to an embodiment.

Figure 2:
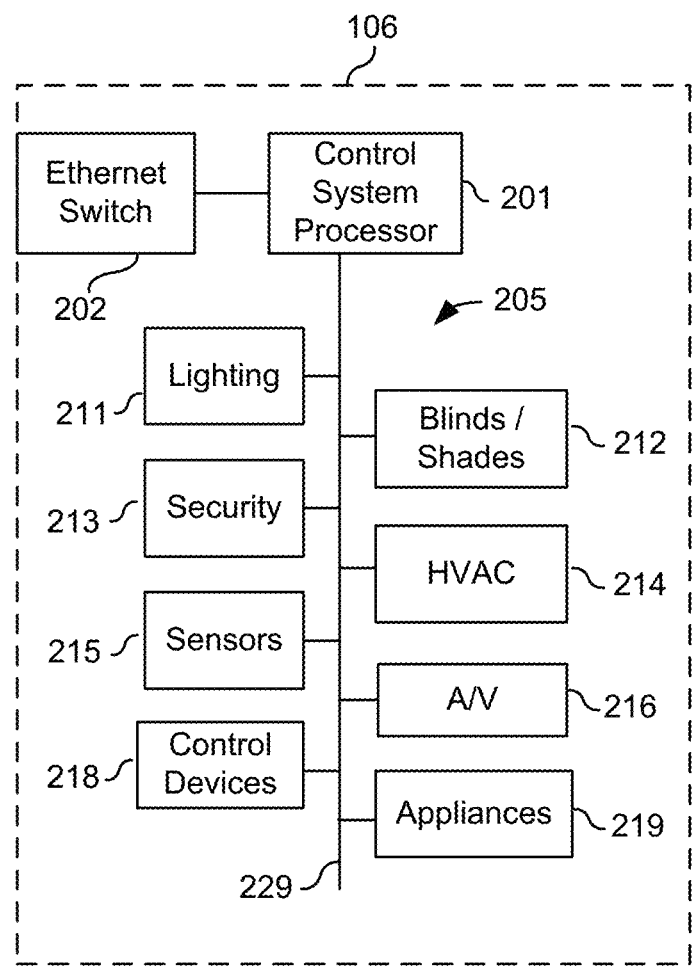

FIG. 2 illustrates a block diagram depicting a building control system according to an embodiment.

Figure 3:
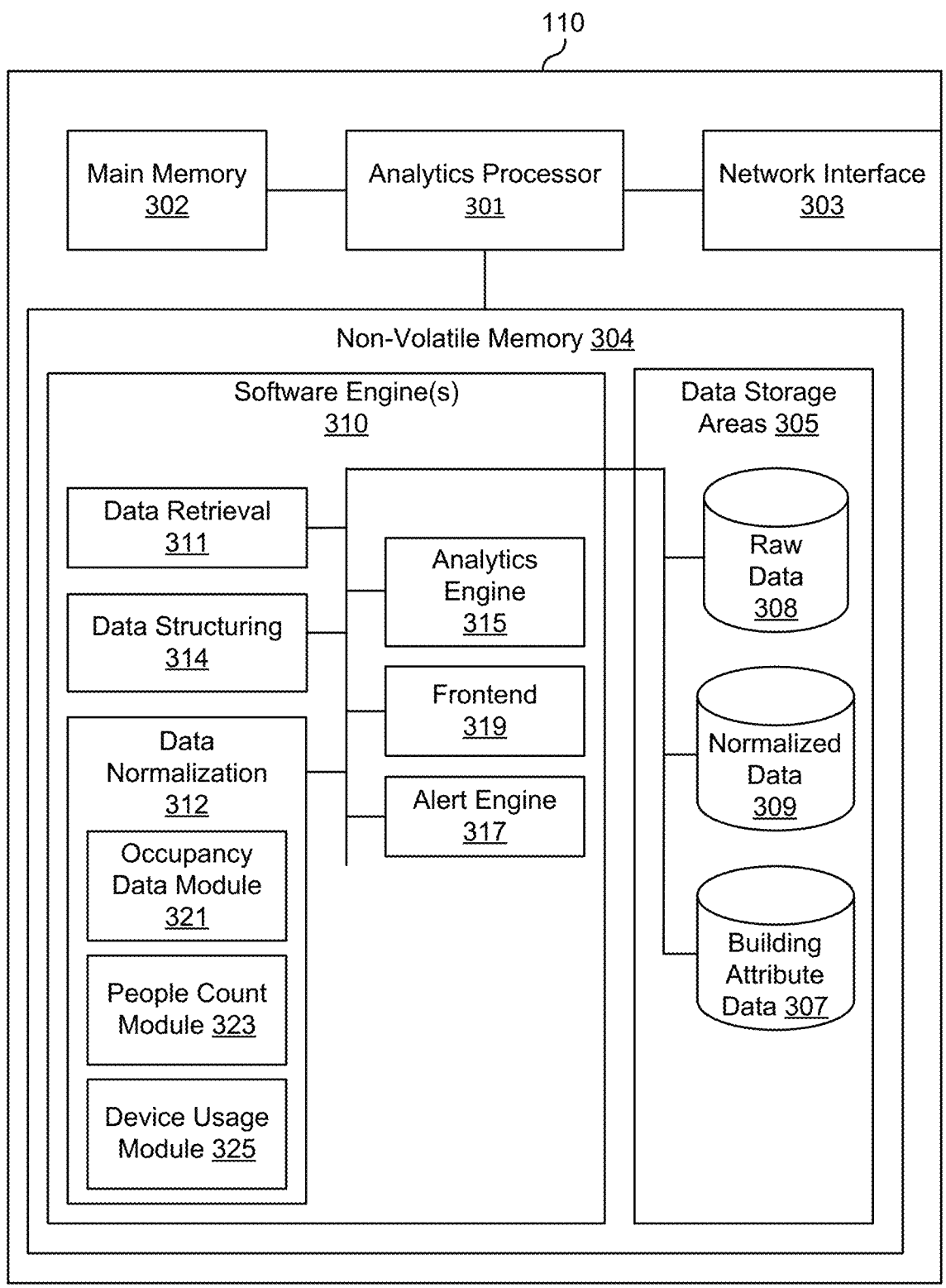

FIG. 3 illustrates a block diagram depicting a building management server according to an embodiment.

Figure 4:
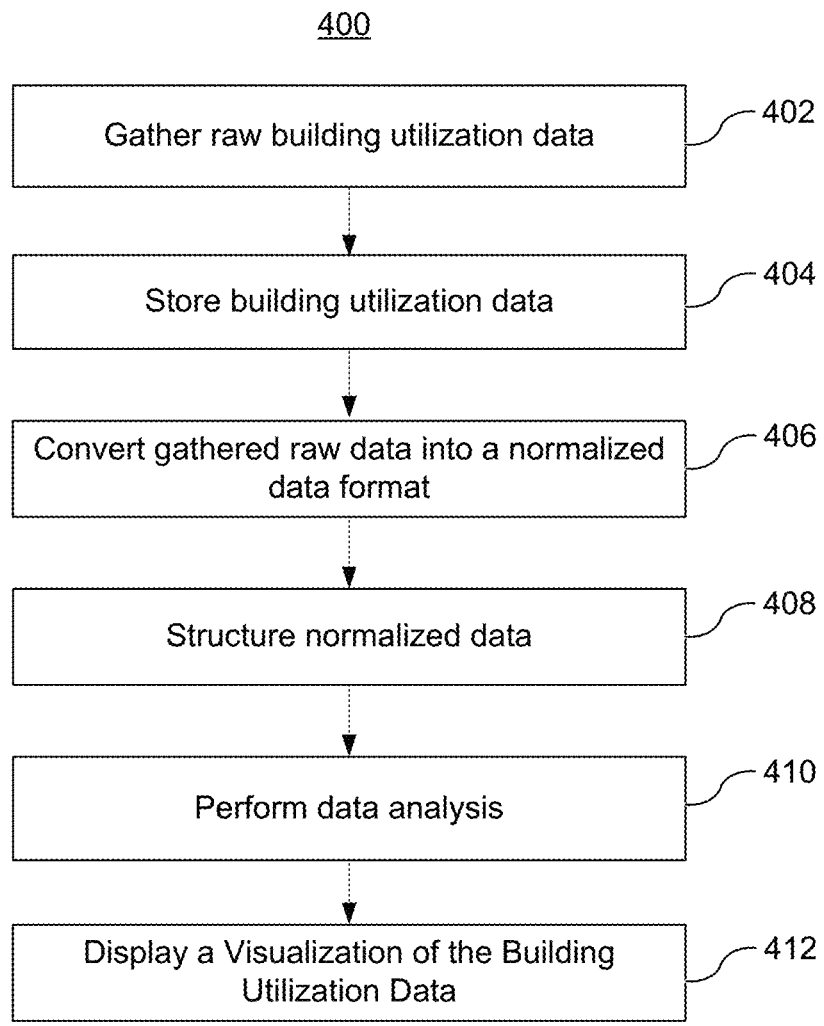

FIG. 4 illustrates a flowchart showing a process for collecting, analyzing, displaying, and monitoring live building utilization according to an embodiment.

Figure 5:
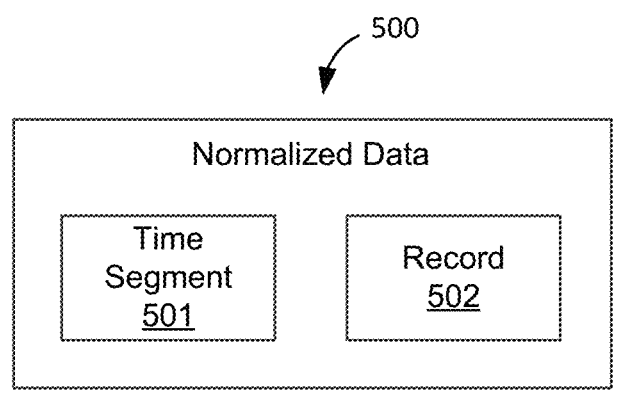

FIG. 5 illustrates a normalized data format according to an embodiment.

Figure 6:
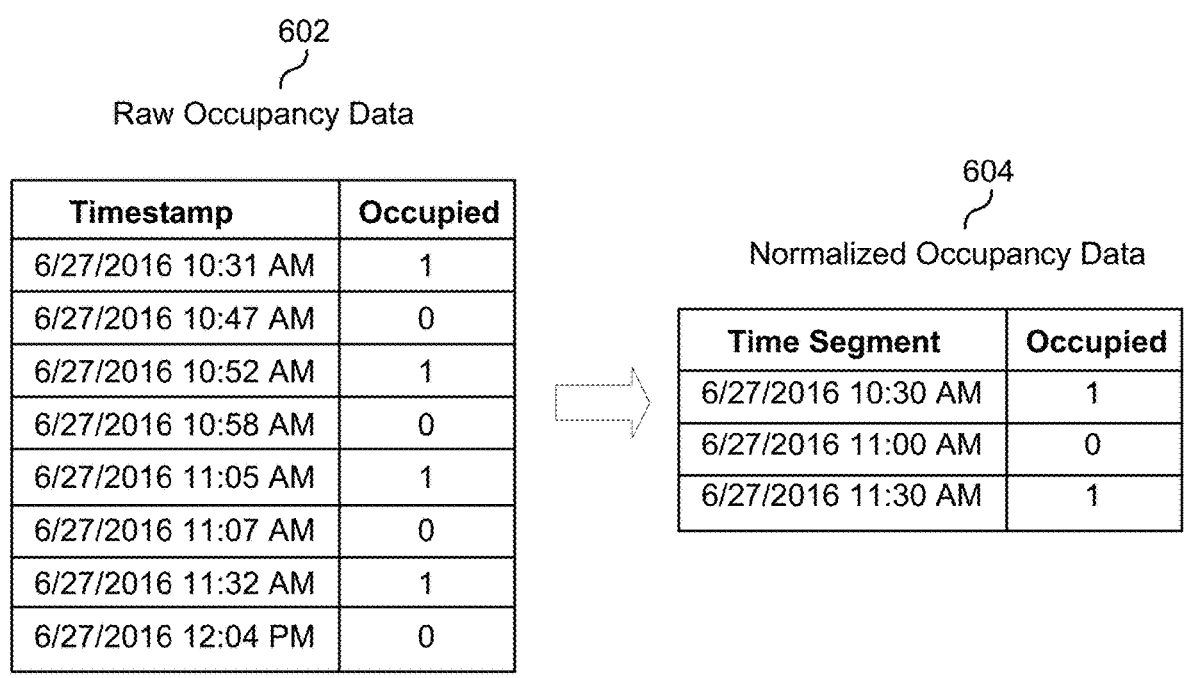

FIG. 6 illustrates exemplary raw occupancy data and normalized occupancy data according to an embodiment.

Figure 7:
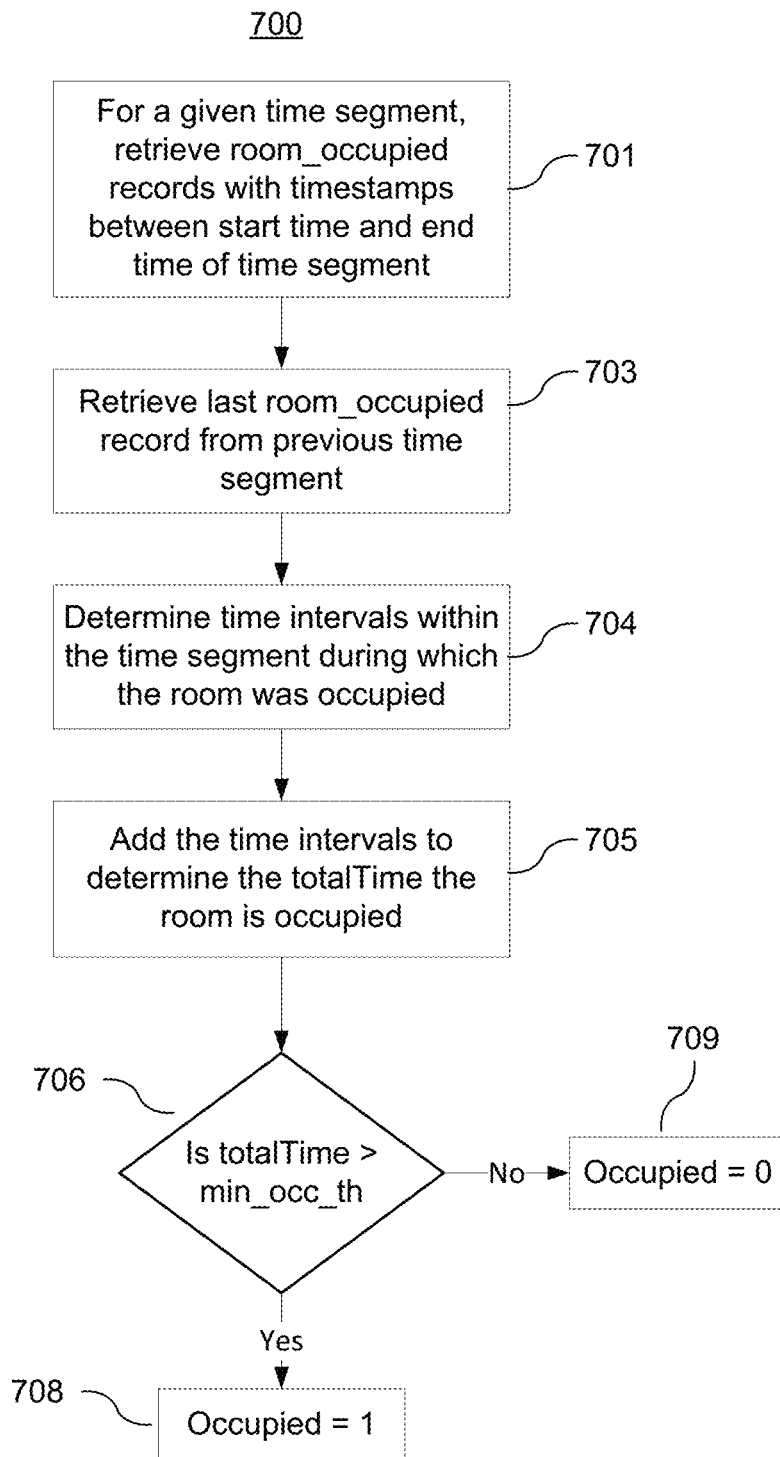

FIG. 7 illustrates a flowchart showing a process for normalizing raw occupancy data according to an embodiment.

Figure 8:
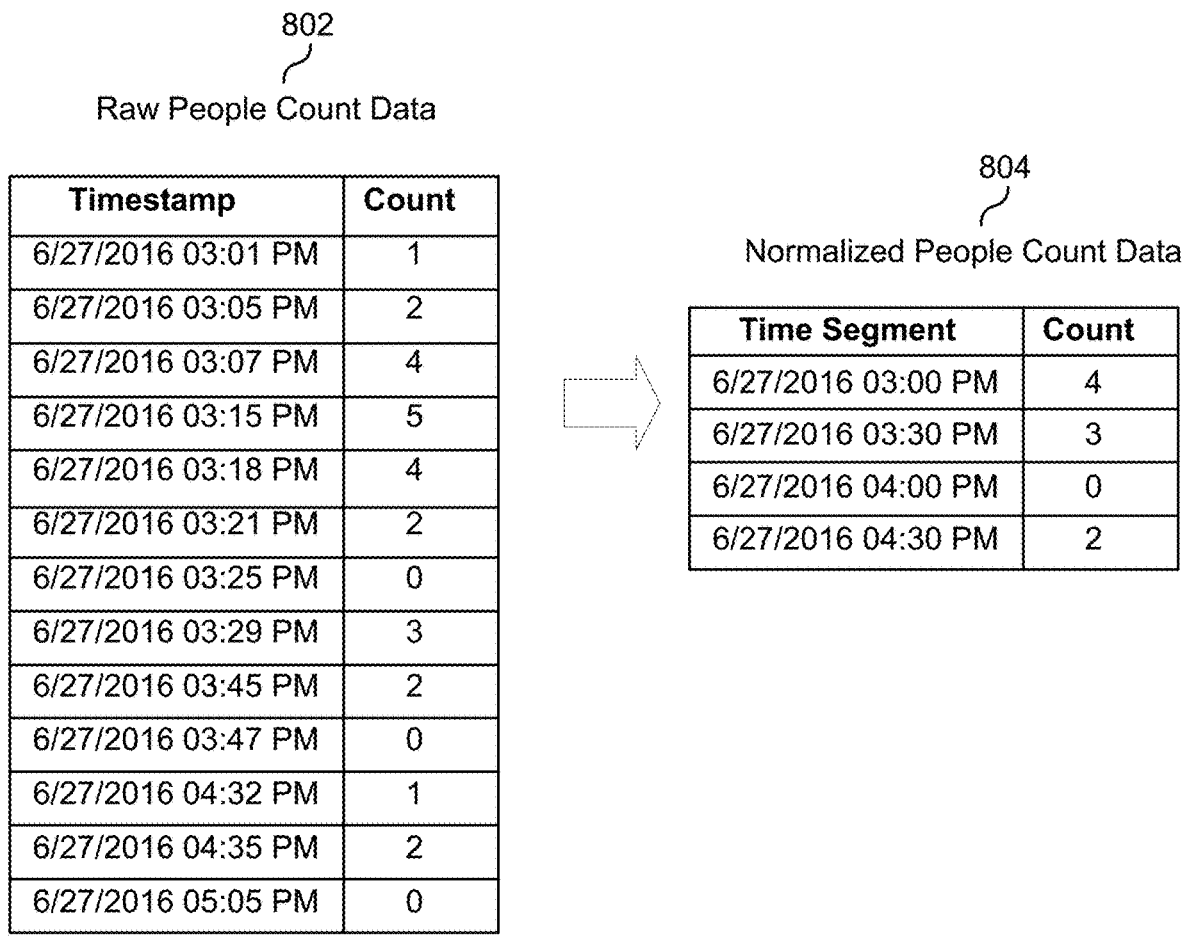

FIG. 8 illustrates exemplary raw people count data and normalized people count data according to an embodiment.

Figure 9:
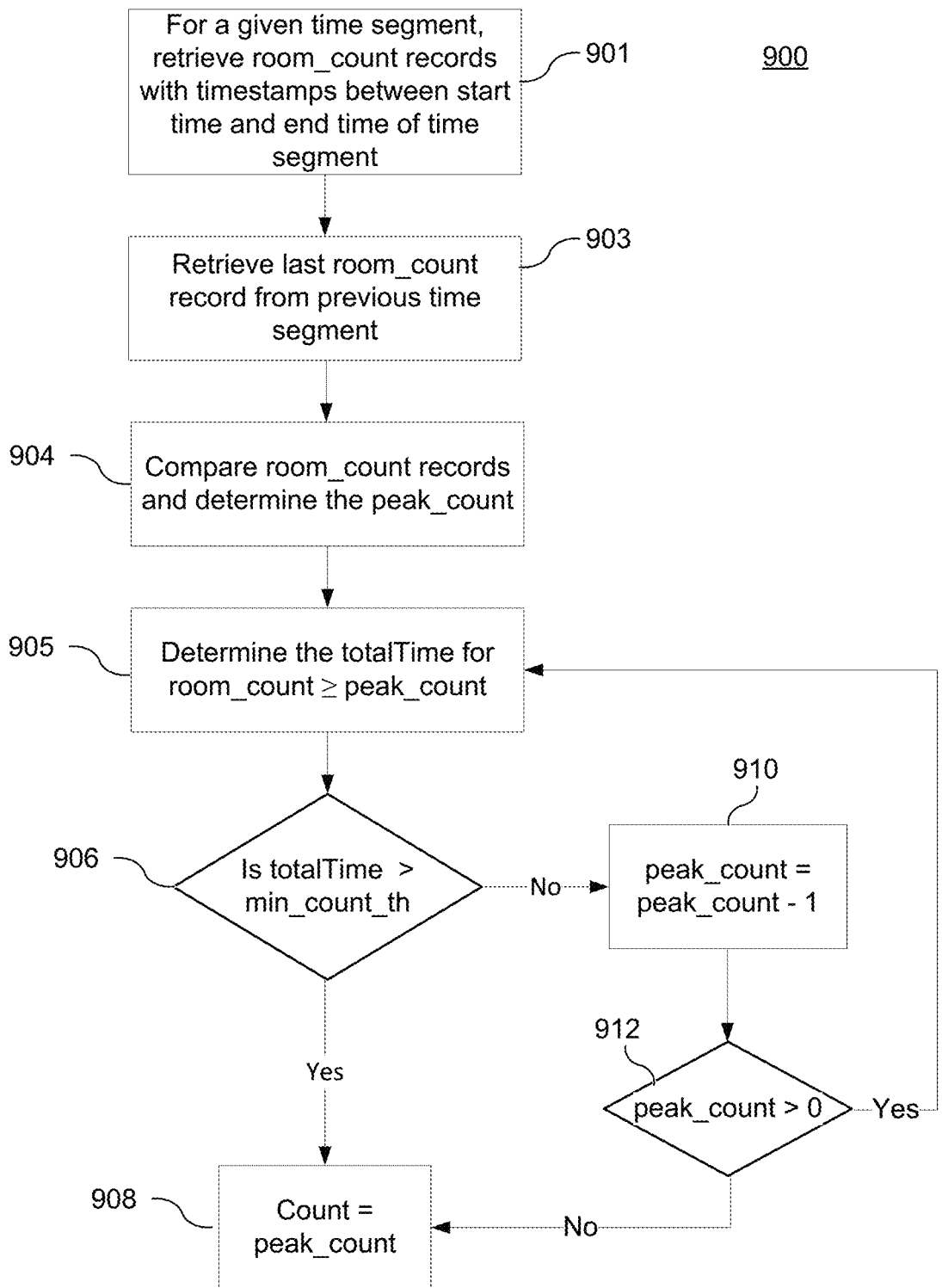

FIG. 9 illustrates a flowchart showing a process for normalizing raw people count data according to an embodiment.

Figure 10:
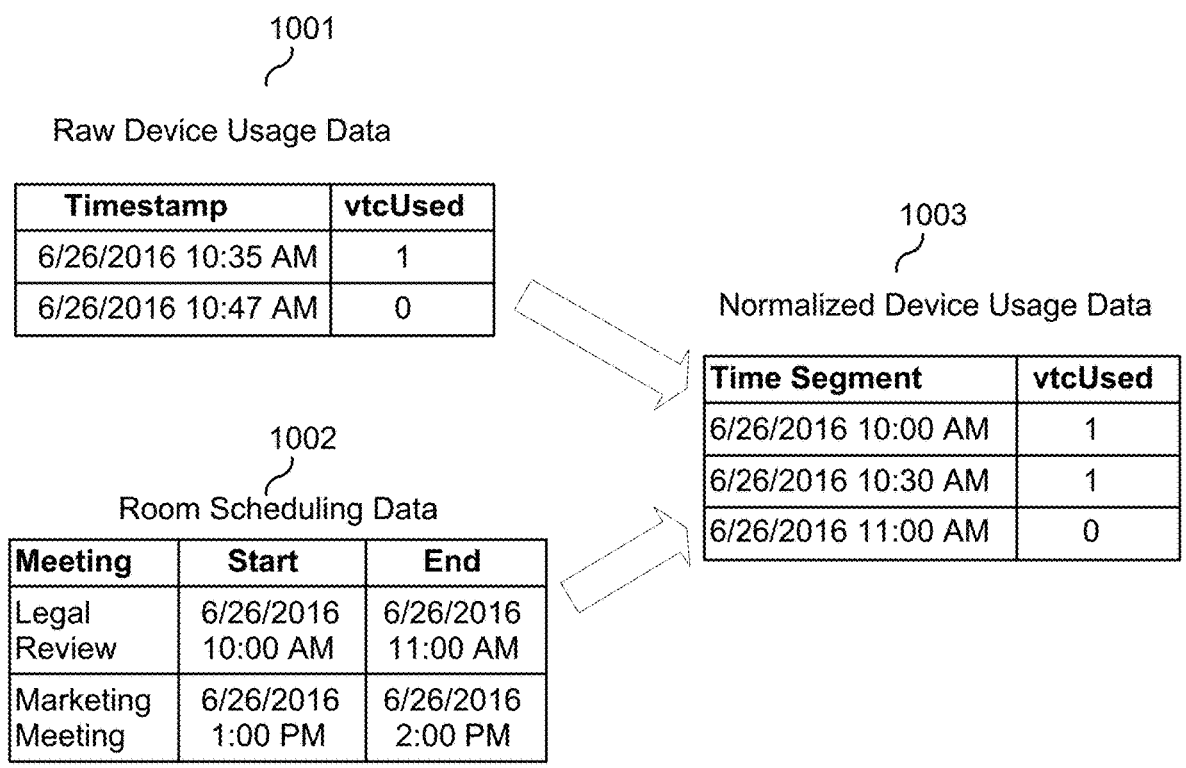

FIG. 10 illustrates exemplary device usage data, room scheduling data, and normalized device usage data according to an embodiment.

Figure 11:
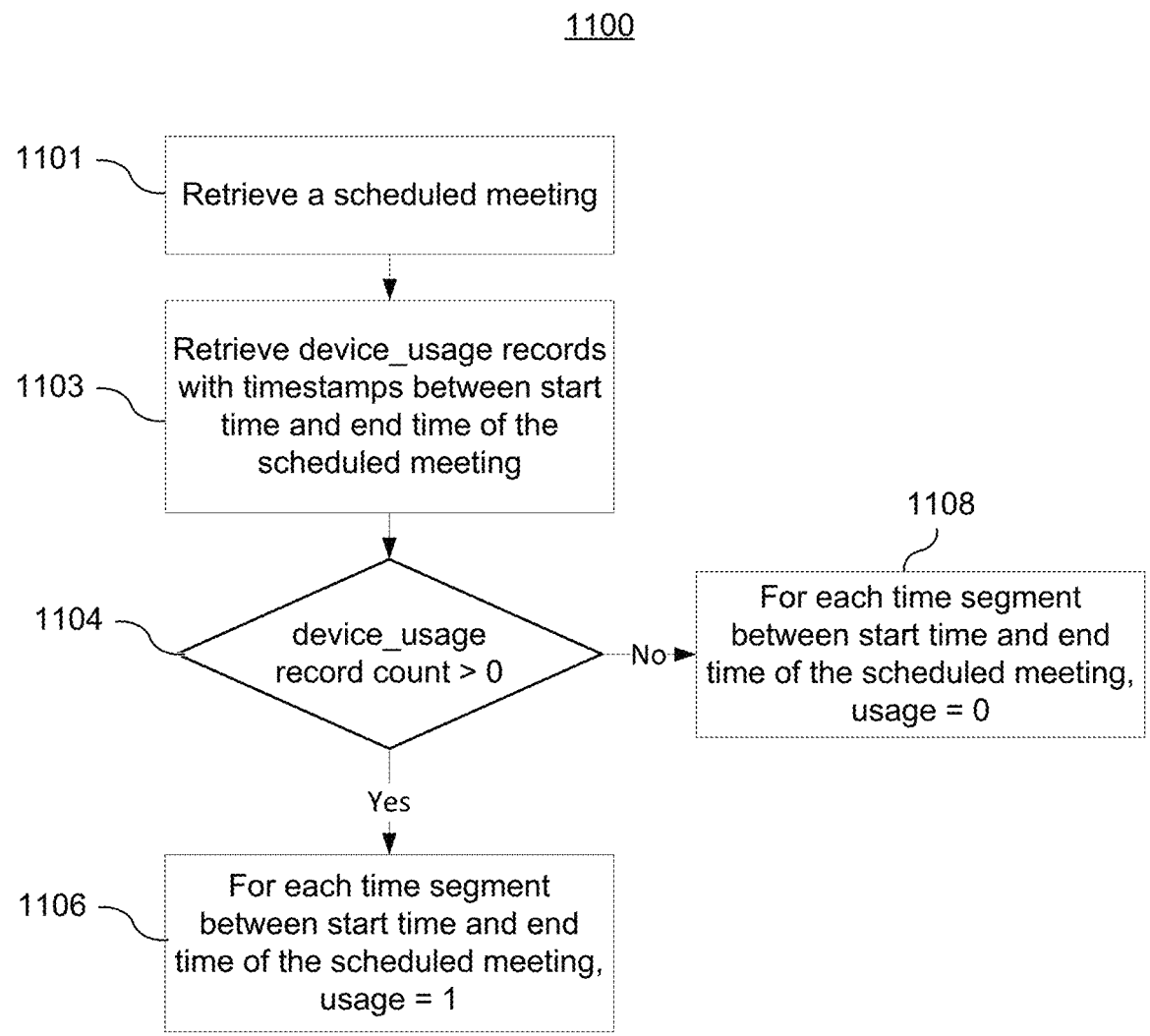

FIG. 11 illustrates a flowchart showing a process for normalizing device usage data according to an embodiment.

Figure 12:
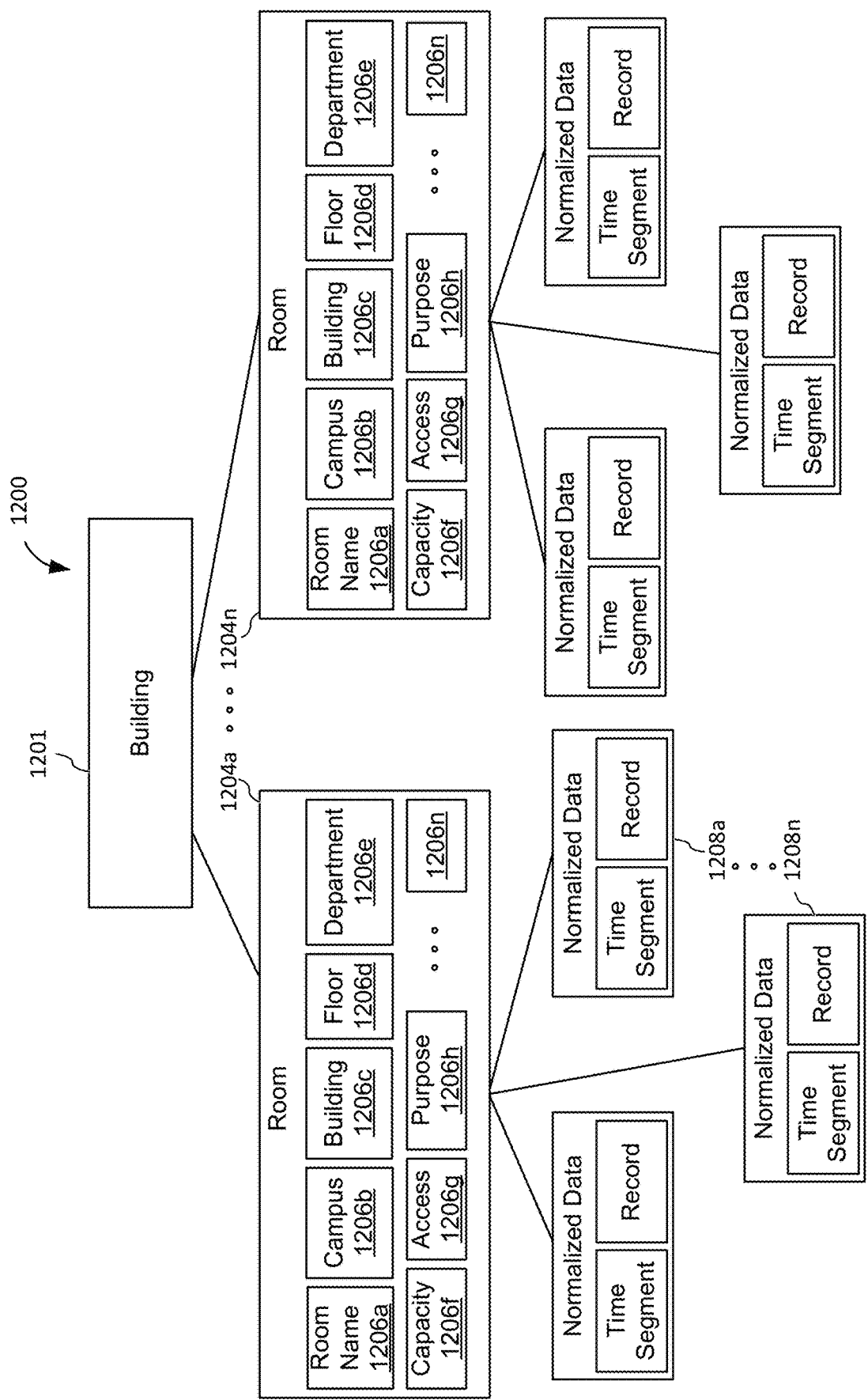

FIG. 12 illustrates a block diagram depicting a data structure generated by the data structuring engine according to an embodiment.

Figure 13:
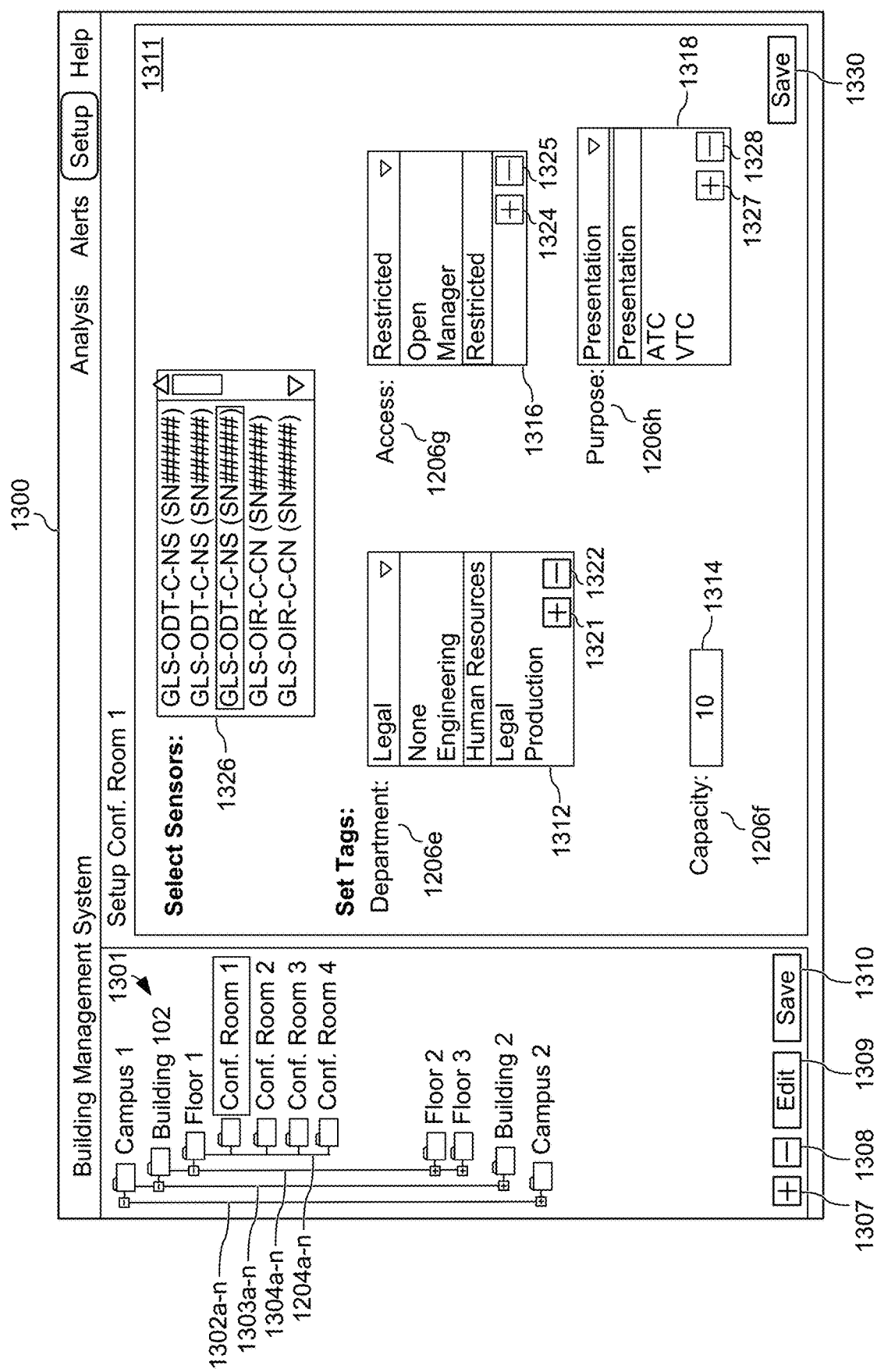

FIG. 13 illustrates a schematic diagram depicting a "Setup" page according to an embodiment.

Figure 14:
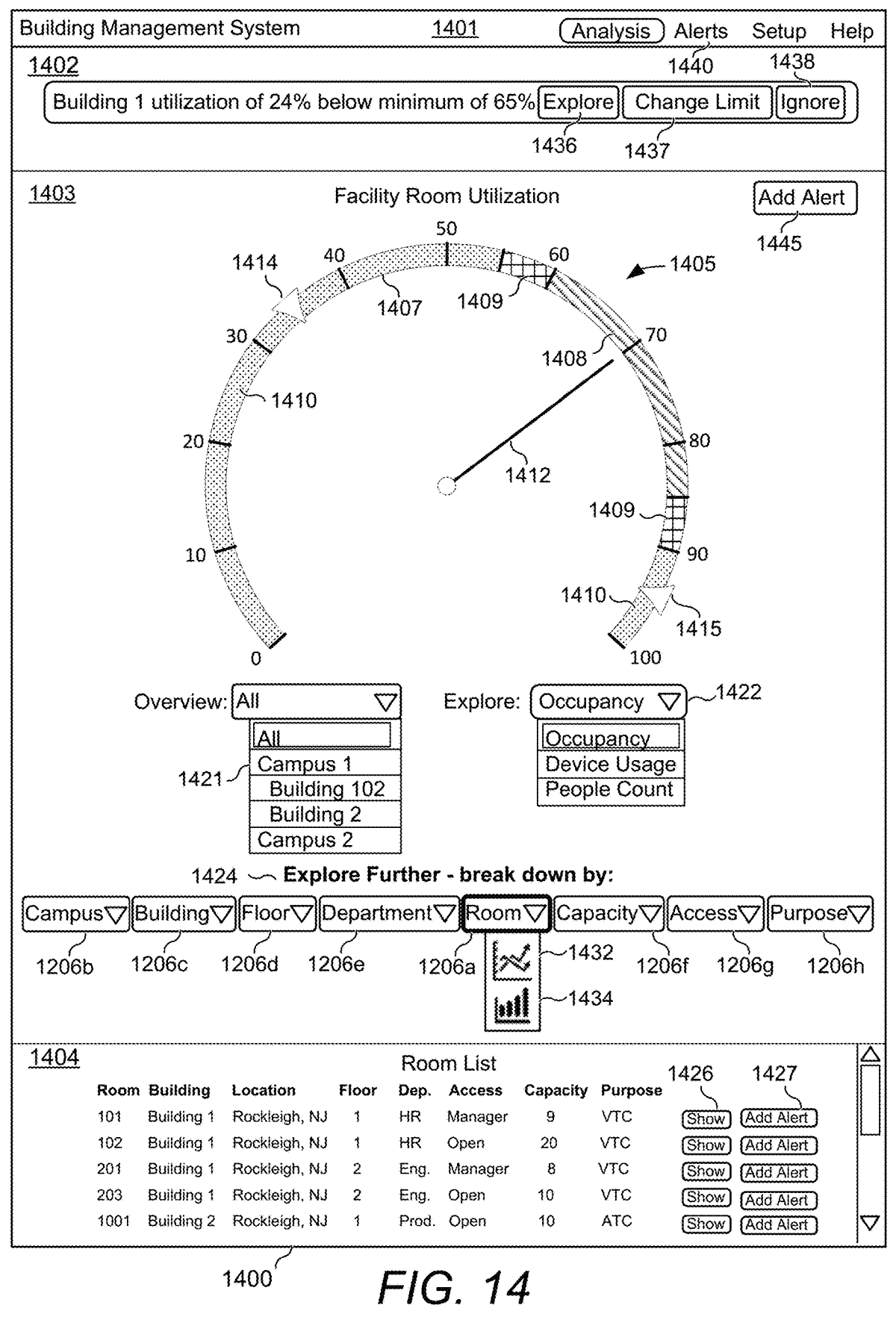

FIG. 14 illustrates a schematic diagram depicting a frontend page illustrating a visualization of the building utilization data according to an embodiment.

FIG. 15 illustrates a schematic diagram depicting a frontend page illustrating a visualization of the building utilization data in the form of a line graph according to an embodiment.

FIG. 16 illustrates a schematic diagram depicting a frontend page illustrating a visualization of the building utilization data in the form of a bar graph according to an embodiment.

Figure 17:
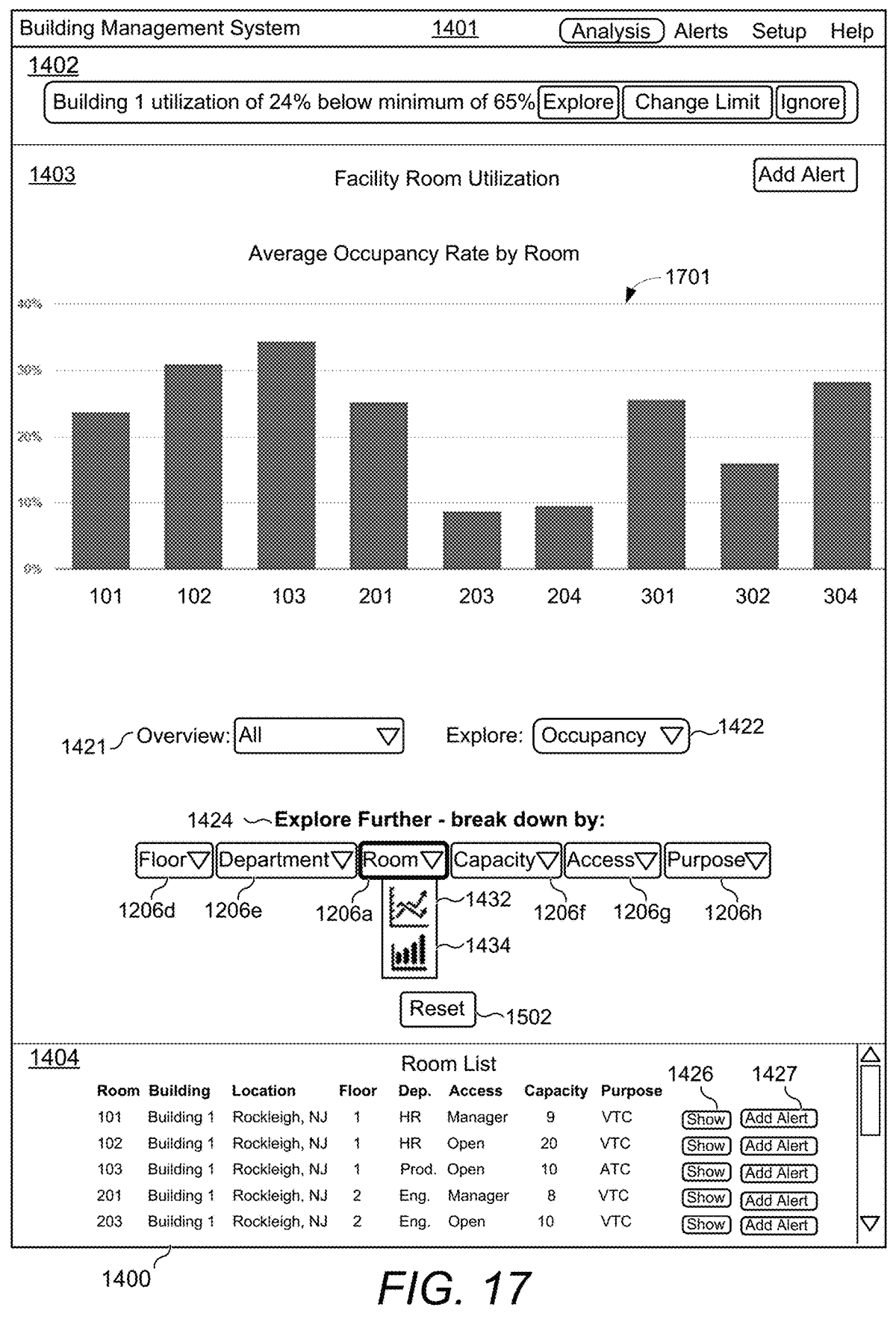

FIG. 17 illustrates a schematic diagram depicting a frontend page illustrating a visualization of the building utilization data split by rooms in the form of a bar graph according to an embodiment.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.
- 100 Building Management System
- 102 Building
- 104 Gateway
- 106 Building Control System
- 107a-n User Communication Devices
- 108 Communication Network
- 109 Calendar Server
- 110 Building Management Server
- 111a-n Occupancy Sensors
- 112a-n People Counter Sensors
- 201 Control System Processor
- 202 Ethernet Switch
- 205 Electronic Devices
- 211 Lighting Devices
- 212 Shading Devices
- 213 Security Devices
- 214 HVAC Devices
- 215 Sensors
- 216 AV Devices
- 218 Control Devices
- 219 Appliances
- 229 Local Area Network
- 301 Analytics Processor
- 302 Main Memory
- 303 Network Interface
- 304 Nonvolatile Memory
- 305 Data Storage Areas
- 307 Building Attribute Data
- 308 Raw Data Database
- 309 Normalized Data Database
- 310 Software Engines
- 311 Data Retrieval Engine
- 312 Data Normalization Engine
- 314 Data Structuring Engine
- 315 Analytics Engine
- 317 Alerts Engine
- 319 Frontend Engine
- 321 Occupancy Data Module
- 323 People Count Module
- 325 Device Usage Module
- 400 A Flowchart Showing a Process for Collecting, Analyzing, Displaying, and Monitoring Live Building Utilization
- 402-412 Steps of Flowchart 400
- 500 Normalized Data Format
- 501 Time Segment
- 502 Record
- 602 Raw Occupancy Data
- 604 Normalized Occupancy Data
- 700 A Flowchart Showing a Process for Normalizing Raw Occupancy Data
- 701-709 Steps of Flowchart 700
- 802 Raw People Count Data
- 804 Normalized People Count Data
- 900 A Flowchart Showing a Process for Normalizing Raw People Count Data
- 901-912 Steps of Flowchart 900
- 1001 Device Usage Data
- 1002 Room Scheduling Data
- 1003 Normalized Device Usage Data
- 1100 A Flowchart Showing a Process for Normalizing Device Usage Data
- 1101-1108 Steps of Flowchart 1100
- 1200 Data Structure
- 1201 Building Node
- 1204a-n Space Nodes
- 1206a-n Tags
- 1206a Room Name Tag
- 1206b Campus Tag
- 1206c Building Tag
- 1206d Floor Tag
- 1206e Department/Team Tag
- 1206f Capacity Tag
- 1206g Access Level Tag
- 1206h Purpose Tag
- 1208a-n Normalized Data Records
- 1300 "Setup" Page
- 1301 Tree Data Structure
- 1302a-n Campus Nodes
- 1303a-n Building Nodes
- 1304a-n Floors Nodes
- 1307 Add Icon Button
- 1308 Delete Icon Button
- 1309 "Edit" Button
- 1310 "Save" Button
- 1311 Room Setup Window
- 1312 Department Tag Drop Down Menu
- 1314 Capacity Tag Fillable Field
- 1316 Access Tag Drop Down Menu
- 1318 Purpose Tag Drop Down Menu
- 1321 Add Icon Button
- 1322 Delete Icon Button
- 1324 Add Icon Button
- 1325 Delete Icon Button
- 1326 "Select Sensors" Section
- 1327 Add Icon Button
- 1328 Delete Icon Button
- 1330 "Save" Button
- 1400 Frontend Page
- 1401 Navigation Bar
- 1402 Alerts Area
- 1403 Building Utilization Visualization Area 1404 List of Visualized Space Nodes
1405 Gauge
1407 Ring User Interface Element
1408 Ideal Measurement Area
1409 Acceptable Measurement Areas
1410 Unwanted Measurement Areas
1412 Central Meter
1414 Minimum Side Arrow
1415 Maximum Side Arrow
1421 "Overview" Drop Down Menu
1422 "Explore" Drop Down Menu
1424 Break Down Bar
1426 "Show" Button
1427 "Add Alert" Button
1432 Line Graph
1434 Bar Graph
1436 "Explore" Button
1437 "Change Limit" Button
1438 "Ignore" Button
1440 "Alerts" tab
1445 "Add Alert" Button
1501 Line Graph
1502 "Reset" Button
1504 State Line
1601 Bar Graph
1602 Bar
1701 Bar Graph

LIST OF ACRONYMS USED IN THE
SPECIFICATION IN ALPHABETICAL ORDER

The following is a list of the acronyms used in the specification in alphabetical order.
API Application Programming Interface
ASICs Application Specific Integrated Circuits
ATC Audioconference Codec
AV Audiovisual
CAN Campus Area Network
CPU Central Processing Unit
COM Communication
EDGE Enhanced Data Rates for GSM Evolution
GUI Graphic User Interface
HVAC Heating, Ventilation and Air Conditioning
ID Identification Number
I/O Input/Output
IP Internet Protocol
IR Infrared
IrDA Infrared Data Association
LAN Local Area Network
LED Light Emitting Diode
MAN Metropolitan Area Network
NIC Network Interface Cards
PAN Personal Area Network
PoE Power over Ethernet
PSTN Public Switched Telephone Network
RAM Random Access Memory
ROM Read-Only Memory
RISC Reduced Instruction Set
UI User Interface
URL Uniform Resource Locator
USB Universal Serial Bus
VTC Videoconference Codec
WAN Wide Area Network

MODE(S) FOR CARRYING OUT THE
INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics, Inc., located in Rockleigh, N.J.

The different aspects of the embodiments described herein pertain to the context of a building management system, but is not limited thereto, except as may be set forth expressly in the appended claims. More specifically, the present embodiments provide systems, methods, and modes for a building management system configured for determining building utilization, and more specifically workspace utilization (defined as how frequently available meeting rooms and technology are actually used productively). The building management system of the present embodiments is a platform for collecting, analyzing, displaying, and monitoring live building utilization and providing up-to-the-minute insights into collected data. The embodiments of the building management system can be used in small, mid, or large scale commercial spaces. While the embodiments are described herein as being implemented for commercial facilities management to provide a view into the efficiency of workspace or meeting space utilization, they are not limited to such an implementation. Products for other markets can be built upon the same framework with minimal modification. The present embodiments may be employed in other type of venues or facilities, including in residential, retail, or nonprofit structures or venues.

The building management system of the present embodiment can be provided as a standalone building analytics service or can be an accessory for integration into a preexisting installation, such as a building control system, a room booking platform, or the like. Additionally, it is designed to be modular, allowing extensions to be built quickly and independently. The total system is further designed to be quickly deployable, allowing temporary installations for short-period studies to be feasible. At the same time, it can be scaled to support a variety of data sources for long-term installations.

The building management system of the present embodiments gathers data from various sources, including room utilization sensors, such as occupancy sensors and people counter sensors, room booking calendar, equipment usage gathered from building control systems, and attributes of the room (such as capacity, department, purpose, access level, etc.). This data is then converted into a normalized format on which a standard set of tools and visualizations can operate. The system of the present embodiments is modular such that new algorithms for normalizing new sources of data can be added in at any time, based on the specific use case's need. In addition to having algorithms to normalize individual sources of data, the present embodiments provide for an algorithm that combines multiple gathered measurements into single normalized results.

The building management system comprises a user interface that displays a visualization of the normalized and/or the combined data to the user to illustrate building utilization in a meaningful way, as further described below. The user interface is meant to provide a low-barrier, guided way for non-technical users to monitor, explore, and compare room utilization data about their facilities. The user interface provides flexibility to allow the user to split and compare the data across any of the room attributes. Limits can be set for any of the measurements to trigger alerts.

FIG. 1 illustrates a block diagram depicting a building management system 100 for managing one or more buildings, such as building 102, according to an embodiment. It should be noted that the exemplary embodiment of system 100 may be varied in one or more aspects without departing from the spirit and scope of the teachings disclosed herein. Building management system 100 may comprise one or more room utilization sensors, including occupancy sensors 111a-n and people counter sensors 112a-n, one or more gateways 104, a building control system 106, a communication network 108, a calendar server 109, a building management server 110, and one or more user communication devices 107a-n. As further discussed below, the building management server 110 gathers and analyzes data from room utilization sensors, such as the occupancy sensors 111a-n and the people counter sensors 112a-n, the calendar server 109, the building control system 106, and displays a visualization of building utilization data via a user communication devices 107a-n.

The gateway 104 and one or more occupancy sensors 101a-n may be installed in building 102 to gather data relevant to building utilization. Gateway 104 may be a single-function control system that collects data from physical equipment, such as occupancy sensors 111a-n and people counter sensors 112a-n. Gateway 104 may comprise a network interface configured for transmitting the collected data via communication network 108 to the building management server 110. Gateway 104 may comprise memory configured for storing collected data temporarily when it cannot access the building management server 110. According to various aspects of the embodiments, the building management system 100 may comprise a single gateway 104 or a plurality of gateways 104 dispersed throughout the building 102 for collecting data. While the gateway 104 may be used to collect, store, and transmit data, according to some embodiments, the gateway 104 may comprise a central processing unit (CPU) configured for providing processing capability to execute an operating system, run various applications, and/or provide processing for one or more of the techniques described herein. According to an embodiment, the gateway 104 may comprise similar configuration as the building management server 110 shown in FIG. 3 and discussed below, and may include main memory 302, processor 301, network interface 303, and non-volatile memory 304 comprising software engines 310 and one or more data storage areas 305.

Occupancy sensors 111a-n are configured to detect the occupancy state of a room in building 102 and generate an occupancy signal based on the occupancy state of that monitored area. For example, the occupancy sensor can generate a binary signal with one logical level representing an occupied state and the other logic level representing a vacant state. Occupancy determinations can be dependent on a number of settings of the occupancy sensor 111a-n, which can be preconfigured or configured through physical interfaces on the occupancy sensor 111a-n or remotely via a graphic user interface (GUI) or remote control. Additionally, sensitivity settings can be determined according to one or more factors such as time event, including time of day, day of week or month of year, a scheduled event, the current occupancy state of the monitored area, or the occupancy state of another area. The sensitivity setting can be determined either locally at the occupancy sensor 111a-n or at a network device and transmitted to the occupancy sensor 111a-n. For example, the timeout period of the occupancy sensor 111a-n can be set. Additionally, the sensitivity of the individual sensors can be set. Finally, the physical direction of the sensors operational range can be set by altering a mask of the occupancy sensor 111a-n.

Each occupancy sensor 111a-n may comprise an infrared sensor that generates a signal based on sensed infrared radiation of the monitored area. A Fresnel lens may cover the infrared sensor for focusing the light to the infrared sensor. In addition, or alternatively, each occupancy sensor 111a-n may comprise an ultrasonic sensor to detect motion. An exemplary occupancy sensor 111a-n includes the GLS-ODT-C-CN Dual-Technology Occupancy Sensor with Cresnet®, available from Crestron Electronics, Inc. of Rockleigh, N.J. According to other embodiments, the occupancy sensors 111a-n may comprise other types of sensors, such as light sensors, photosensors, sound sensors, microphones, or the like.

People counter sensors 112a-n are configured to count the people present in a room in the building 102 and generate a people count signal. For example, the people counter sensor can generate a signal representing the number of the people present in the room. Each people counter device 112a-n may comprise a people counter camera that records a video of the room and performs video processing to determine the number of people present in the room at any given time. In another embodiment, the gateway 104 (or the building management server 110) may comprise a central processing unit with software configured for performing video processing to determine the number of people present in the room. The people count is then transmitted over communication network 108 to the building management server 110. According to other embodiments, the people counter sensors 112a-n may comprise other types of people counter sensors, such as a thermal counter that detects heat sources using infrared thermography or thermal imaging, infrared beam counter that uses an infrared beam across an entrance that increment a count when the infrared beam is broken, a chair occupancy sensor that may comprise a pressure pad that senses a change in force or weight and outputs an occupancy signal, any combinations thereof, or the like.

The occupancy sensors 111a-n and people counter sensors 112a-n can communicate with the gateway 104 via a wired connection or wirelessly. For example, a wireless connection may be provided using an infiNET EX® protocol from Crestron Electronics, Inc. of Rockleigh, N.J., an IEEE 802.15.4 ZigBee® protocol from the ZigBee Alliance, a Bluetooth® network, an 802.11 wireless network (e.g., Wi-Fi), or other wireless networks known in the art or later discovered. A wired connection may, for example, include an Ethernet connection. Gateway 104, occupancy sensors 111a-n, and people counter sensors 112a-n may operate on an independent wireline or wireless network, or they may connect to the local area network 229 (FIG. 2) of the building control system 106.

Communication network 108 can incorporate one or more of the Internet, a wide area network (WAN), a local area network (LAN), a personal area network (PAN), a wireless network, a campus area network (CAN), a metropolitan area network (MAN), or the like. Communication network 108 may include a public switched telephone network (PSTN), a cable telephony network, an Internet Protocol (IP) telephony network, a wireless network, a hybrid Cable/PSTN network, a hybrid IP/PSTN network, a hybrid wireless/PSTN network, or any other suitable communication network or combination of communication networks. In addition, other network embodiments can be deployed with many variations in the number and type of devices, communication networks, communication protocols, system topologies, and myriad other details without departing from the spirit and scope of the present embodiments. Communication network 108 may include one or more gateway devices to provide with an entrance to communication network 108, which may include software and/or hardware components to manage traffic entering and exiting communication network 108 and conversion between the communication protocols used by various communication devices.

The calendar server 109 is configured for maintaining calendar data or room scheduling data for spaces, such as meeting rooms, within building 102. The calendar data or room scheduling data may include a schedule for meeting rooms available for scheduling in building 102. The schedule may indicate whether a room is reserved or unreserved for a meeting, and for each reserved meeting, the calendar data may include the start time and end time of the meeting, the name of the meeting organizer, the subject of the meeting, the number of participants in the meeting, and other information pertaining to the meeting. For example, the calendar server 109 may comprise calendar services including, without limitation, Microsoft Outlook® Exchange Calendar, Yahoo! Calendar®, Lotus Notes®, as well as others.

The building management server 110 may further collect data from a building control system 106 installed in a building. FIG. 2 illustrates a block diagram depicting a building control system 106 according to an embodiment. The building control system 106 may comprise one or more control system processors 201 in communication with the building management server 110 via an Ethernet switch 202 and communication network 108. Control system processor 201 may be connected to various electronic devices 205 throughout building 102 via a wireline or wireless local area network 229. The control system processor 201 is used for, among other things, controlling and monitoring various devices and environmental conditions throughout a structure. The control system processor 201 may be a Crestron 3-Series Control system available from Crestron Electronics, Inc. of Rockleigh, N.J. The Crestron 3-Series Control system provides a complete integrated audiovisual (AV) or automation solution. The control system processor 201 may control one or more of the following electronic devices 205: lighting devices 211, including but not limited to lamps, ballasts, light emitting diode (LED) drivers; heating, ventilation and air conditioning (HVAC) devices 214 including but not limited to thermostats, air conditioning units, heating units, filtration systems, fans, humidifiers; shading devices 212 including but not limited to motorized window treatments, dimmable windows; sensors 215, including but not limited to occupancy sensors, proximity sensors, sound sensors, microphones, temperature sensors; audiovisual (AV) devices 216, including but not limited to content sources, content sinks, video recorders, cameras, VCR, DVD/DVR, CD player, audio receivers, audio system devices, speakers, telephones, video phones, videoconference codecs (VTC), projectors, projector screens, touch panels, cable television box, television such as plasma, liquid crystal display, light-emitting diode flat panel, and cathode ray tube television; security devices 213 including but not limited to security cameras, monitors and door locks; appliances 219 including but not limited to refrigerators, ovens, blenders, microwaves; control devices 218 including but not limited to switches, relays, current limiting devices; industrial devices including but not limited to motors, pumps, chillers, and air compressors. Other types of electronic devices 205 are contemplated depending on building implementation.

One or more network interfaces may provide connectivity between the control system processor 201 and electronic devices 205, and among the electronic devices 205 via the local area network 229. The network interface may represent, for example, one or more network interface cards (NIC) or a network controller. In certain embodiments, the network interface may include a PAN interface. The PAN interface may provide capabilities to network with, for example, a Bluetooth® network, an IEEE 802.15.4 (e.g. Zigbee network), or an ultra-wideband network. As should be appreciated, the networks accessed by the PAN interface may, but do not necessarily, represent low power, low bandwidth, or close range wireless connections. The PAN interface may permit one electronic device 201/205 to connect to another local electronic device 201/205 via an ad-hoc or peer-to-peer connection.

The network interface may also include a LAN interface. The LAN interface may represent an interface to a wired Ethernet-based network but may also represent an interface to a wireless LAN, such as an 802.11x wireless network. Additionally, in many cases, a connection between two electronic devices 201/205 via the LAN interface may involve communication through a network router or other intermediary device. Ethernet connectivity enables integration with IP-controllable devices and allows the processors to be part of a larger managed control network. Whether residing on a sensitive corporate LAN, a home network, or accessing the Internet through a cable modem, the control processor 201 may provide secure, reliable interconnectivity with IP-enabled devices, such as touch screens, computers, mobile devices, video displays, Blu-ray Disc® players, media servers, security systems, lighting, HVAC, and other equipment—both locally and globally. For some embodiments, the network interfaces may include the capability to connect directly to a WAN via a WAN interface. The WAN interface may permit connection to a cellular data network, such as the EDGE network or other 3G network. According to some aspects of the embodiments, each controllable electronic device 205 may comprise a power over Ethernet (PoE) interface for receiving electric power as well as for sending and receiving signals over an Internet Protocol (IP) based network.

The control system processor 201 and electronic devices 205 may also include one or more wired input/output (I/O) interface for a wired connection between one electronic device and another electronic device. One or more wired interfaces may represent a serial port, for example a communication (COM) port or a universal serial bus (USB) port. Additionally, the wired I/O interface may represent, for example, a Cresnet® port. Cresnet® connectivity provides a network wiring solution for Crestron keypads, lighting controls, thermostats, and other devices that do not require the higher speed of Ethernet. The Cresnet® bus offers wiring and configuration, carrying bidirectional communication and 24 VDC power to each device over a simple 4-conductor cable.

One or more infrared (IR) interfaces may enable the control system processor 201 and electronic devices 205 to receive and/or transmit signals with infrared light. The IR interface may comply with the Infrared Data Association (IrDA) specification for data transmission. Alternatively, the IR interface may function exclusively to receive control signals or to output control signals. The IR interface may provide a direct connection with one or more devices such as a centralized AV sources, video displays, and other devices. One or more programmable relay ports may enable the control system processor 201 and/or electronic devices 205, such as control devices 218, to control window shades, projection screens, lifts, power controllers, and other contact-closure actuated equipment. One or more "Versiport" I/O ports may enable the integration of occupancy sensors, power sensors, door switches, or anything device that provides a dry contact closure, low-voltage logic, or 0-10 Volt DC signal.

According to an aspect of the embodiments, instead of installing additional room utilization sensors, such as the occupancy sensors 111a-n and people counter sensors 112a-n, the building management system 100 can leverage the use of existing electronic devices 205 installed in the building 102, including sensors 215 and security devices 213 (e.g., cameras) to collect building utilization data. These devices may be paired with the gateway 104 via the local area network 229.

Referring back to FIG. 1, building management server 110 may be always active and accessible to any user communication device 107a-n from any location via a unique Uniform Resource Locator (URL) and host name. User communication devices 107a-n may access the services provided by the building management server 110 using a web-browser, such as Internet Explorer, Microsoft Edge, Firefox, Google Chrome, Opera, Safari, or the like. While the embodiments are described herein as accessing server 110 via a web-browser, the present embodiments are not limited to such an implementation. According to other embodiments, the user communication devices 107a-n may comprise a proprietary native mobile app, or any other similar software application, configured to access server 110 via the communication network 108. User communication devices 107a-n may be any computers known in the art, including, but not limited to a desktop computer, a laptop, a portable electronic device, a mobile computer, a smartphone, a tablet, a personal digital assistant, or any other computer configured for communicating with a remove server, such as server 110, via a communication network 108 through a web-browser or other similar application. Each user communication device 107a-n may comprise a central processing unit (CPU), a user interface (e.g., display, keyboard, mouse, or the like), one of numerous forms of storage (e.g., solid-state memory (random access memory (RAM), read-only memory (ROM), and the like), magnetic memory, such as disc drives, tape storage, and the like, and/or optical memory, such as DVD), and a network interface, as is known in the art. Using the network interface, each user communication device 107a-n can communicate with server 110 over the communication network 108.

Referring to FIG. 3 there is shown a block diagram depicting the building management server 110 according to an embodiment. Building management server 110 may be a dedicated, private server, employing standard security protocols. Server 110 may be incorporated into a conventional standalone server, although in other embodiments, the function of server 110 may be distributed across multiple computing systems and architectures. Multiple, redundant servers may be provided for additional backup and security. For example, server 110 may include separate web, app, or email servers.

Server 110 may comprise one or more network interfaces 303 to provide connectivity with, among other things, gateway 104, calendar server 109, user communication devices 107a-n, and building control system 106. The network interface 303 may represent, for example, one or more network interface cards (NIC) or a network controller. According to an embodiment, the network interface 303 includes the capability to connect directly to a wide area network (WAN). The network interface 303 may permit a connection to a cellular data network, such as the Enhanced Data rates for GSM Evolution (EDGE) network or other 3G network.

Server 110 may include a central processing unit (CPU) or an analytics processor 301 configured for providing processing capability to execute an operating system, run various applications, and/or provide processing for one or more of the techniques described herein. For example, the analytics processor 301 may represent one or more microprocessors, and the microprocessors may be "general purpose" microprocessors, a combination of general and special purpose microprocessors, or application specific integrated circuits (ASICs). Additionally or alternatively, the analytics processor 301 may include one or more reduced instruction set (RISC) processors, video processors, or related chip sets.

Server 110 may further include any one of numerous forms of storage, including main memory 302 and nonvolatile memory 304. Main memory 302 may be communicably coupled to the analytics processor 301 and may store data and executable code. The main memory 302 may represent volatile memory such as random access memory (RAM), but may also include nonvolatile memory, such as read-only memory (ROM) or Flash memory. In buffering or caching data related to operations of the analytics processor 301, the main memory 302 may store data associated with various engines and modules running on the server 110.

The nonvolatile memory 304 may represent any suitable nonvolatile storage medium, such as a hard disk drive or nonvolatile memory, such as Flash memory. Being well-suited to long-term storage, the nonvolatile storage 304 may store data files such as media (e.g., music and video files) and software (e.g., for implementing functions on the server 110), among other types of data.

Nonvolatile storage 304 may include software engines 310 operable to enable the analysis and visualization of building utilization, as well as perform other operations discussed below. Depending upon implementation, various aspects of teachings of the present embodiments may be implemented in a single software engine, a plurality of software engines, in one or more hardwired components or in a combination of hardwired and software systems. In addition to one or more software engines 310, nonvolatile storage 304 also includes one or more data storage areas 305. A data storage area 305 is operably associated with the main memory 302 and analytics processor 301. Data storage areas 305 of non-volatile storage 304 may be leveraged to maintain data pertinent to the building 102 for gathering, processing, and displaying a visualization of building utilization data. Data storage areas 305, or portions thereof, may also be utilized to store myriad other data. The number and types of software engines and data storage areas may be varied and, as such, the specific arrangement discussed herein is presented primarily for descriptive purposes.

The data storage areas 305 may comprise a raw data database 308. The raw data database 308 may contain the measurements collected by the gateway 104. This separate database 308 allows the functions applied by the analytics processor 301 to be non-destructive to the measurements stored therein. According to one embodiment, the gateway 104 may apply minimal or no processing to the data it gathers before sending it to the building management server 110 for storage on the raw data database 308. According to another embodiment, the gateway 104 may perform some of the data processing executed by the software engines 310 as discussed herein. It should be understood that server 110 and/or database 308 harboring the measurement data may be a single unit or a plurality of servers/databases. The database 308 can be co-located with the server 110, or it can be located remotely in various different systems and locations.

The software engines 310 may comprise a data normalization engine 312 comprising an occupancy data module 321, a people count module 323, and a device usage module 325, as will be further discussed below. The data normalization engine 312 is configured for retrieving new records since last retrieval from the raw data database 308 and converting this raw data into a structured form that the other pieces of the software engines 310 can operate on, as further discussed in detail below. This normalized data is stored in the normalized data database 309 for access by the other software engines 310. Normalized data database 309 and/or server 110 may be a single unit or a plurality of servers/databases such that the database 309 can be co-located with the server 110, or it can be located remotely in various different systems and locations.

The software engines 310 may further comprise a data structuring engine 314 configured for structuring the normalized data in order to establish relationships between different pieces of data and split data along building attributes as will be further described below. To that end, the data storage areas 305 may comprise a building attribute database 307. The building attribute database 307 may contain project files containing information regarding various facilities maintained by the building management server 110. Each project file can contain various attributes or tags relevant to each facility, such as building 102, as will be later described. For example, building attribute data may define hierarchical relationships between various spaces within building 102, as well as containing information related to the building and each space or room, such as room names, campus or location, building name, floor, department (or team), room capacity, room access level, available resources or purpose, and the like. The database 307 can be co-located with the server 110, or it can be located remotely in various different systems and locations.

The software engines 310 may also comprise a data retrieval engine 311. The data retrieval engine 311 is configured for interfacing with sources of data other than the gateway 104, such as the calendar server 109 and building control system 106. The data retrieval engine 311 stores the data it retrieves in the raw data database 308 and ushers it to data normalization engine 312.

The software engines 310 also comprise the analytics engine 315 configured for performing relevant calculations on the normalized data stored on the normalized data database 309, including determining means, spans, rates of change, standard deviations, comparisons across groups, or the like. Additionally, the software engines 310 may comprise an alerts engine 317 configured for comparing the results of the calculations to define boundaries and issue alerts for display to an end user when those results exceed those boundaries.

The software engines 310 further comprise a frontend engine 319. The frontend engine 319 is configured for providing a visual display through which the end user interacts with the system. The frontend engine 319 may be leveraged in association with one or more included software engines 310 and data available in data storage areas 305 to enable visual layout and presentation structure of the building management services provided by server 110. For example, it may display graphs, allow the user to adjust settings, and display alerts, as will be further described. The frontend engine 319 may be configured for providing a web-based user interface on the user communication devices 107a-n through which the user can interact with the building management system 100. Particularly, the frontend engine 319 may comprise a client-server software application which runs in a web-browser of a client computer, such as one or more user communication devices 107a-n. To that end, the frontend engine 319 may comprise a web application programming interface (API) which is exposed via the web. FIGS. 13-17, discussed below, include embodiments of various webpages whose presentation and layout may be provided by the frontend engine 319. In another embodiment, the building management system 100 may comprise a proprietary native mobile app in communication with building management server 110. By leveraging remote access to the building management server 110, a user may monitor workspace utilization of building 102 and adjust settings using any user communication device 107a-n from anywhere in the world without any need for a local copy of any special software.

FIG. 4 illustrates a flowchart 400 showing a process by a building management system for collecting, analyzing, displaying, and monitoring live building utilization according to an embodiment. Process 400 can be performed by the various software engines 310 of the building management server 110 shown in FIG. 3.

In step 402, the building management server 110 gathers building utilization data from various sources. Building management server 110 may receive building utilization data from gateway 104, which was gathered by building utilization sensors, such as occupancy sensors 111a-n and people counter sensors 112a-n. The building management server 110 also retrieves relevant data from data sources other than the gateway 104. The building management server 110 may retrieve scheduling information of rooms located in building 102 from the calendar server 109. The building management server 110 may further retrieve equipment usage data from the building control system 106. In step 404, this data may be stored on the raw data database 308 so that is can be accessible at any time by the analytics processor 301.

In step 406, the gathered raw data from the raw data database 308 is converted via the data normalization ending 312 into a single normalized data format that the various tools of the analytics processor 310 can use and manipulate. Referring to FIG. 5, the normalized data format 500 may be a two-tuple pairing of a time segment 501 and a single measurement or record 502, in the form of {Time_Segment, Record}. The minimal time segments 501 are defined a priori (i.e., fixed time segments). For example, in the case of the building analytics implementation, time segments may be 30 minute or half hour intervals that correspond to the calendar data, which generally comprises 30 minute scheduling intervals. The data normalization engine 312 saves the normalized data tuples 500 to normalized data database 309. Each data source, whether a sensor collected through the gateway 104 or a network resource, may have a separate module within the data normalization engine 312 that includes an algorithm for performing the normalization procedure. Referring to FIG. 3, the data normalization engine 312 may comprise an occupancy data module 321, a people count module 323, and a device usage module 325. Additionally, other modules are contemplated by the present embodiments for other types of data.

The occupancy data module 321 is configured for normalizing raw occupancy data obtained from occupancy sensors 111a-n. Raw occupancy data stored on raw data database 308 generally comprises a series of time stamped occupancy state changes for a room. More specifically, the raw occupancy data comprises an occupancy state associated with a timestamp indicating when the occupancy state has changed, in the form of {Timestamp, Record}. Exemplary raw occupancy data 602 is shown in FIG. 6. This raw occupancy data is accessed by the occupancy data module 321 to be converted to the normalized data format 500 to indicate whether or not for a given time segment the room is occupied or not. Particularly, the occupancy data module 321 determines whether the total amount of time the room was occupied during a given time segment (e.g., half hour time segment) exceeds a predetermined minimum occupancy threshold. In other words, whether the room was occupied above some percentage of time of the meeting.

FIG. 7 illustrates a flowchart 700 showing a process executed by the occupancy data module 321 for normalizing raw occupancy data. In step 701, for a given time segment the occupancy data module 321 retrieves occupancy records indicating whether the room was occupied or not ("room_occupied" records) with timestamps falling between the start time of time segment and end time of time segment. In step 703, the occupancy data module 321 also retrieves the last room occupancy record from the previous time segment. Since the raw occupancy data comprises only changes in occupancy states, the last room occupancy record from the previous time segment indicates the room's occupancy state at the start time of the time segment. In step 704, the occupancy data module 321 determines the time intervals during which the room was occupied. In step 705, these time intervals are added to determine the total amount of time the room was occupied or "totalTime". In step 706, the occupancy data module 321 determines whether the totalTime exceeds a minimum occupancy threshold or "min_occ_th". If so, in step 708 the room is counted as occupied (i.e., record 502=1) for that time segment. If it does not exceed the minimum occupancy threshold the room is counted as unoccupied or vacant (i.e., record 502=0) in step 709.

According an embodiment, the following may be an algorithm used by the occupancy data module 321 for normalizing raw occupancy data for a half-hour time segment:

According to an embodiment, the minimum occupancy threshold or "min_occ_th" may be 15 minutes. However, other threshold values can be predetermined. Accordingly, if a room is occupied for over 15 minutes during a half hour interval, then the room is determined as occupied. Referring to FIG. 6, using the above algorithm, the occupancy data module 321 will yield the normalized occupancy data 604 from raw occupancy data 602. For example, for the 11:00 AM time segment, the room is counted as vacant because between 11:00 AM and 11:30 AM the room was occupied a total of two minutes. On the other hand, for the 11:30 AM time segment the room is counted as occupied because between 11:30 AM and 12:00 PM the room was occupied for a total of 28 minutes (i.e., the room was occupied between 11:32 AM and 12:00 PM).

The people count module 323 is configured for normalized raw people count data obtained from people counter sensors 112a-n. Raw people count data stored on raw data database 308 generally comprises a series of time stamped people count changes for a room. More specifically, the raw people count data comprises a people count associated with a timestamp indicating when the people count has changed, in the form of {Timestamp, Record}. Exemplary raw people count data 802 is shown in FIG. 8. The raw people count data is accessed by the people count module 323 to be converted to the normalized data format 500 to indicate the number of people occupying the room for a given time segment. According to an embodiment, the people count module 323 determines a peak number of people that lasts for a predetermined minimum amount of time during a given time segment (e.g., 30 minutes).

FIG. 9 illustrates a flowchart 900 showing a process executed by the people count module 323 for normalizing raw people count data. In step 901, for a given time segment, the people count module 323 retrieves records indicating the number of people that were present in the room ("room_count" records) with timestamps falling between the start time of time segment and the end time of time segment. In step 903, the people count module 323 also retrieves the last room count record from the previous time segment. Since the raw people count data comprises only changes in people count, the last room count record from the previous time segment indicates the room's people count at the start time

```
totalTime is the amount of time the room was occupied
room_occupied is the record of whether the room is occupied
occ_timestamp(a) is the timestamp associated with room_occupied(a)
min_occ_th is a predetermined minimum occupancy threshold
---------------------------------------------------------------------------------------------------------
If the previous half hour ended with room_occupied == 1
    Let room_occupied(y) be next record where room_occupied == 0
    totalTime = occ_timestamp(y) - start_of_half_hour
Else
    totalTime = 0
End if
Loop through room_occupied(x) until occ_timestamp(x) > end_of_half_hour
    If room_occupied(x) == 1 AND room_occupied(x+1) == 0
        totalTime = totalTime + (occ_timstamp(x+1) - occ_timestamp(x))
    End if
End loop
If room_occupied(x) == 1 AND occ_timestamp(x) > end_of_half_hour
    totalTime = totalTime + (end_of_half_hour - occ_timestamp(X)
End if
If totalTime > min_occ_th
    Result = {time: start_of_half_hour, occupied: 1}
Else
    Result = {time: start_of_half_hour, occupied: 0}
End if
``` of the time segment. In step 904, the people count module 323 compares the room_count records and determines the most amount of people that were present in the room during the time segment, or the "peak_count". Then, in step 905, the people count module 323 determines a time interval during which the room count was equal to or exceeding the peak count, or the ("totalTime"). Then, in step 906, the people count module 323 determines whether the totalTime exceeds a minimum count threshold or "min_count_th". If so, the count of the room is set to the determined "peak_count" in step 908. If not, in step 910 the peak count is decremented by 1. In step 912, the people count module 323 determines whether the peak_count is larger than zero. If not, the count of the room is set to the determined peak_count (i.e., zero value). If the peak_count is larger than zero, then the process returns to step 905 in which the people count module 323 determines the time interval during which the room count was equal to or exceeding the decremented peak count. That time period is compared to the minimum count threshold in step 906. Steps 905, 906, 910, and 912 are repeated until the peak count equals to zero or until the totalTime for a peak count value exceeds the minimum count threshold.

According to an embodiment, the predetermined minimum amount of time or "min_count_th" may be 10 minutes. However, other threshold values can be predetermined. Thus, for a 30 minute time segment, the people count module 323 determines the highest number people that were present for more than 10 minutes. Referring to FIG. 8, using the above method, the people count module 323 will yield the normalized people count data 804 from raw people count data 802. For example, for the 3:00 PM time segment (i.e., between 3:00 PM and 3:30 PM) the highest number of people that were present was 5, but only for 3 minutes (e.g., may be someone walked in and out but did not actually participate in the meeting). Thus, this people count is decremented by one to 4. There were at least 4 people present (i.e., step 905) between 3:07 PM and 3:21 PM, for a total of 14 minutes (i.e., over the minimum threshold of 10 minutes). Thus, for the 3:00 PM time segment, the people count is recorded as 4. For the 3:30 PM time period, there were 3 people present at 3:30 PM (as recorded in timestamp of 3:29 PM), which was reduced to two people at 3:45 PM. Thus, the peak count of 3 people during the 3:30 PM time segment lasted for 15 minutes (i.e., over the minimum threshold of 10 minutes). Accordingly, for the 3:30 PM time segment, the people count is recorded as 3. For 4:00 PM time segment, the last room_count record from previous time segment (with timestamp of 3:47 PM) was 0. There was no other room_count record recorded. Therefore, for the 4:00 PM time segment, the people count is recorded as 0.

The device usage module 325 is configured for normalizing raw device usage data obtained from the building control system 106 and calendar server 109. Raw device usage data stored on raw data database 308 may comprise a series of time stamped device usage state changes for a room. More specifically, the raw device usage data may comprise a device usage state (0 if not used, or 1 if used) associated with a timestamp indicating when the device usage state has changed, in the form of {Timestamp, Record}. Exemplary raw device usage data for a videoconference codec (VTC) is shown in FIG. 10, including device usage data 1001 obtained from the building control system 106 and room scheduling data 1002 obtained from the calendar server 109. However, device usage data for other types of electronic devices 205, as described above, may also be recorded. This raw data 1001 and 1002 is accessed by the device usage module 325 to be converted into the normalized data format 500 to indicate device or equipment usage. According to an embodiment, in the case of device usage, if a device is ever used during a scheduled meeting, it is counted as being used during all of the time segments falling within the scheduled meeting.

FIG. 11 illustrates a flowchart 1100 showing a process executed by the device usage module 325 for normalizing device usage data. In step 1101, the device usage module 325 retrieves a scheduled meeting data with start time and end time. The scheduled meeting data may be retrieved using the data retrieval engine 311 from the calendar server 109. This data may be stored in the raw data database 308. In step 1103, the device usage module 325 retrieves device usage records (i.e., "device_usage" records) with timestamps falling between the start time and end time of the scheduled meeting. The device usage records may be retrieved using the data retrieval engine 311 from the building control system 106 and stored in the raw data database 308. In step 1104, the device usage module 325 determines whether the device_usage record count is greater than zero—i.e., whether at least one device usage record has been recorded indicating that a device was used at least once during a scheduled meeting. If so, in step 1106, the device usage module 325 counts that a device has been used (usage=1) for each time segment that falls between the start time and end time of the scheduled meeting. If no device usage records were recorded and retrieve in step 1103, and therefore device_usage record count is not greater than zero, then in step 1108, device usage is counted as zero for each time segment that falls between the start time and end time of the scheduled meeting.

According an embodiment, the following may be an algorithm used by the device usage module 325 for normalizing raw device usage data for a half-hour time segment:

```
vtcUsed is the record of whether VTC was used in a meeting
-----------------------------------------------------------------------------------------
Retrieve meeting
Retrieve vtcUsed where meeting.startTime < vtcUsed.timestamp < meeting.EndTime
If count(vtcUsed) > 0 then
    For each half_hour between meeting.startTime and meeting.endTime
        Result = {time: start_of_half_hour, vtcUsed: 1}
    End for
Else
    For each half_hour between meeting.startTime and meeting.endTime
        Result = {time: start_of_half_hour, vtcUsed: 0}
    End for
End if
```

Referring to FIG. 10, using the device usage algorithm, the device usage module 325 will yield the normalized device usage data 1003 from raw device usage data 1001 obtained from the building control system 106 and room scheduling data 1002 obtained from the calendar server 109. For example, during the legal review meeting with start time of 10:00 AM and end time of 11:00 AM, there were two raw device_usage records at 10:35 AM and 10:47 AM. Since there are at least one existing record, the device usage module 325 counts that a device was used during that meeting (i.e., record=1). The device usage module 325 determines that there are two time segments that fall within the legal review meeting, including 10:00 AM and 10:30 AM time segments. For both of these time segments, the device usage module 325 records device usage as "1".

Although the data normalization step 406 in FIG. 4 has been described as being performed by the analytics processor 301 of the building management server 110 (FIG. 3), the above described data normalization process may alternatively, or in addition, be performed by the gateway 104. To that end, the gateway 104 may comprise a similar configuration as the building management server 110, including a network interface 303, analytics processor 301, main memory 302, and non-volatile memory 304 as described above. The non-volatile memory 304 of gateway 104 may contain software engines 310, including the data normalization engine 312. The gateway 104 may gather raw building utilization data from building utilization devices, such as occupancy sensors 111*a-n* and people counter sensors 112*a-n*. As the data is gathered, the gateway 104 may convert this data to normalized data in line with the methods described above. The gateway 104 may store this data in a normalized data database 309 in data storage areas 305 of its non-volatile memory 304, and transmit the normalized data to the building management server 110 for further processing using network interface 303. According to an embodiment, the building management server 110 may still contain the data normalization engine 312 for converting data received from other sources, such as the building control system 106 and calendar server 109.

Referring back to FIG. 4, after the raw data is normalized, the normalized data is structured in step 408. According to an embodiment, referring to FIG. 3, the data structuring engine 314 accesses the normalized data stored in normalized data database 309 as well as the building attribute data stored in the building attribute database 307. The building attribute database 307 may comprise project files comprising information regarding the facility related to rooms to be monitored by the building management server 110. For example, building 102 may be associated with a project file including information on its campus location and building name, as well as information regarding the various rooms, or meeting rooms, within the facility, such as the number and type of meeting rooms, meeting room names, the floor on which the each meeting room is located, the departments (or teams) to which the meeting room belongs, the room capacity, access level, available resources or the like. The data structuring engine 312 uses that information to structure the normalized data.

FIG. 12 shows a block diagram depicting a data structure 1200 generated by the data structuring engine 314 according to an illustrative embodiment. The data structuring engine 314 creates a building node 1201 for the facility under which the data is structured. Under the building node 1201, the data structuring engine 314 creates space nodes 1204*a-n* organized in a tree topology, with the building as the root and individual spaces as children. The space nodes 1204*a-n* are created based on the rooms listed in the project file of building 102. The project file may be created based on information entered by a user using a user communication device 107*a-n*, as will be further described below. For example, the user may specify the number of rooms located in building 102 and enter information related to each room. For each entered room, the data structuring engine 314 may create a space node, such as a space node 1204*a*.

Each space node 1204*a-n* is then associated with attributes called tags 1206*a-n*, each tag defining a single state. For example, space nodes 1206*a-n* may be associated with the following tags: room name tag 1206*a*, campus tag 1206*b*, building tag 1206*c*, floor tag 1206*d*, department/team tag 1206*e*, capacity tag 1206*f*, access level tag 1206*g*, purpose tag 1206*h*, or other types of tags.

FIG. 13 illustrates a schematic diagram depicting a "Setup" page 1300 according to an embodiment used to create space nodes 1204*a-n* and associated tags 1206*a-n*. According to an embodiment, the user may utilize the "Setup" page 1300 to create a hierarchical tree data structure 1301 which organizes monitored facilities by building layout. The tree data structure 1301 may include campus nodes 1302*a-n* as the root nodes, each comprising one or more building nodes 1303*a-n* of buildings located in associated campuses. Each building node 1303*a-n* may include a list of monitored space nodes 1204*a-n*, such as conference rooms, located within the associated building. The space nodes 1204*a-n* may be organized in a tree topology, with the building node 1303*a-n* as the root, floor nodes 1304*a-n* as children, and individual space nodes 1204*a-n* as sub-children. Initially, the "Setup" page 1300 may include a simple data structure with prepopulated node names, including "Campus 1" as the root, with the following sub-children: "Building 1", "Floor 1", and "Conf. Room 1". Any subsequently added nodes may be assigned a default name with an incremented count. For example, the user may add a campus node 1302*a-n*, by pressing on "Campus 1" and pressing the add icon button 1307. In response, "Campus 2" node may be created with similar sub-children. The user may add a building node 1303*a-n* under "Campus 1" by pressing on "Building 1" and pressing the add icon button 1307. In response, "Building 2" node is created with "Floor 1" node, and "Conf. Room 1" node as sub-children. The use may add a room node or a space node under building 102 by pressing on an existing room node and pressing the add icon button 1307. A node may be deleted by selecting a node and pressing the delete icon button 1308. Additional campus nodes, building nodes, floor nodes, and space nodes can be added or deleted in a similar fashion. The user may change the default names of any of the nodes by selecting the node and pressing the "Edit" button 1309. In response, the selected node appears in the form of a fillable field allowing the user to change the node name. "Save" button 1310 may be pressed to save any changes in a project file on the building attribute database 307.

According to an embodiment, tree data structure 1301 may be populated with information retrieved from an existing building control system 106, which may already organize controlled spaces using a tree data structure. The user may hide or delete any space nodes for which room utilization monitoring is not desired, such as private offices. Each space node within the tree data structure 1301 may be associated with one or more electronic devices 205 installed in building 102. These associations may be created by the user and/or retrieved from building control system 106.

According to an embodiment, the user may associate room utilization sensors, including occupancy sensors 111*a-n* and people counter sensors 112*a-n*, with each space node. The user may select a space node 1204*a-n* from tree data structure 1301 to associate with room utilization sensors. For example, the user may select "Conf. Room 1". In response, a room setup window 1311 may be displayed by the "Setup" page 1300 containing a "Select Sensors" section 1326 comprising a list of discovered sensor devices. According to an embodiment, the "Setup" page 1300 may initially display a "Discover" button (not shown) configured for initiating a discovery or search mode. During the discovery mode, the server 110 may communicate with the gateway 104 to discover room utilization sensors 111a-n and 112a-n connected to the gateway 104. The discovery process may provide a list of discovered sensors as shown in the "Select Sensors" section 1326. Each sensor may be identified by a unique identification number ("ID"), such as the device's serial number, as well as a model number, device name, device type, or the like. The user may click on particular sensors to assign those sensors to the selected space node. After pressing the "Save" button 1330, the analytics processor 301 may save the sensor identification information as an attribute for the space node in the building attribute database 307. Each space node may be further associated with other types of data sources, such as the building control system 106 and calendar server 109 in a similar manner. For example, the building management server 110 may access the calendar server 109 and display a list of rooms managed by the calendar server 109. The user may associate these calendar rooms with space nodes.

The data structuring engine 314 may use the data from the tree data structure 1301 to generate tags 1206a-d for each space node 1204a-n. The state of each tag is chosen based on the data and hierarchy of the tree data structure 1301. Tag states may comprise the node names entered by the user. The data structuring engine 314 may create room name tags 1206a using the room names entered by the user in the tree data structure 1301 and associate these tags with respective space nodes 1204a-n. Furthermore, for each space node 1204a-n, the data structuring engine 314 may associate a campus tag 1206b, a building tag 1206c, and a floor tag 1206d using the data and hierarchy of the tree data structure 1301—i.e., the names of the parent nodes of a space node would be designated as tag states for that space node. For example, for "Conf. Room 1", the data structuring engine 314 may create a "Conf. Room 1" name tag 1206a, "Floor 1" floor tag 1206d, "Building 102" building tag 1206c, and "Campus 1" campus tag 1206b.

The other type of tags 1206e-n may comprise a set of states from which a particular single state can be chosen and associated with a space node. According to an embodiment, the user may predefine the states by entering information defining the sets of possible states using a user communication device 107a-n. Other tags may have states that are already predefined by the building management system 100. The user may then tag nodes by selecting a tag and choosing a predefined tag state from the set of tag states. The data structuring engine 314 in turn associates the chosen states with the tags of the space nodes.

Referring to FIG. 13, the user may select a space node 1204a-n from tree data structure 1301 to associate tags. For example, the user may select "Conf. Room 1". In response, a room setup window 1311 may be displayed including various tag selections, such as the department/team tag 1206e, capacity tag 1206f, access level tag 1206g, and purpose tag 1206h. For the department or team tag 1206e, the user may associate the room with one of the various departments or teams located within building 102. Using a drop down menu 1312, the user may tag each space node 1204a-n with a department state to identify the department or team with which the room is associated, e.g., "none", "engineering", "human resources", "Legal", "Production", etc. The user may add additional departments using an add icon button 1321 or delete a department from the department drop down menu 1312 using the delete icon button 1322.

For the capacity tag 1206f, the user may utilize a fillable field 1314 to tag each space node 1204a-n with a room capacity number to identify the maximum capacity for the room. For example, the user may enter "10" in fillable field 1314.

The access level tag 1206g may contain a drop down menu 1316 containing a set of predefined access levels, such as an "open" state (i.e., room is accessible by any employee), a "manager" state (i.e., room is only accessible by the managers), or a "restricted" state (i.e., room is only accessible by employees listed on a restricted list). The user may tag each room node 1204a-n with the appropriate access level state configured for identifying the types of employees the room may be used by. The user may add additional access level states using the add icon button 1324 or delete an access level state using the delete icon button 1325.

Similarly, the purpose tag 1206h may comprise a drop down menu 1318 including a set of predefined purpose states, including, for example, a "presentation" room state (i.e., a room containing a display screen for presenting presentations), an "ATC" room state (i.e., a room containing audioconference codec (ATC) equipment), a "VTC" room state (i.e., a room containing videoconference codec (VTC) equipment), or the like. The user may tag each space node 1204a-n with the appropriate purpose state to identify the purpose or type of a meeting that can be held in the room based on the available resources, such as electronic devices 205, located in the room. The user may add additional purpose states using the add icon button 1327 or delete a purpose state using the delete icon button 1328.

Additional attributes can be associated with a space node to define other information, such as the location of external data sources (e.g., location of room scheduling data). Other tags and states may also be utilized as required by a specific implementation. Although a tree data structure 1301, drop down menus, and fillable fields are illustrated for associating tags 1206a-n with space nodes 1204a-n, other data entry tools may be utilized without departing from the scope of the present embodiments.

Referring back to FIG. 12, the data structuring engine 314 associates the selected tags with the relevant space nodes, creates the tree data structure 1200, and stores it in the building attribute database 307. As room utilization data is collected and normalized, the data structuring engine 314 associates the normalized data with a space node 1204a-n corresponding to a room in the building 102 from where the data was collected. Accordingly, multiple individual tuples 1208a-n, or normalized data records, may be associated with single nodes. According to an embodiment, space nodes 1204a-n can be structured in a tree format, with each lower level inheriting the tags of the level above it.

Referring back to FIG. 4, in step 410 the analytics engine 315 of the analytics processor 301 then operates on the normalized data to perform various calculations. Because the data is normalized, these calculations become possible and relevant. These calculations may include: (a) mean—average of a measurement along a rolling time period; (b) median—center value of a measurement along a rolling time period; (c) standard deviation—mathematical standard deviation showing the spread of collected measurements; (d) rate of change—how quickly a measurement changes over a time period; or the like. According to the present embodiments, because the data is further structured, each of these calculations may be performed for each space node, each tag state, for the entire set of nodes together, or for any subset of nodes or tags. Calculations that can be performed between tag states may include: (a) disparity of mean—how large is the difference of means between two tag states; (b) disparity of median—how large is the difference of medians between two tag states; (c) disparity of rate of change—how large is the difference between the rates of change between two tag states; or the like. Once completed, these calculations are associated with the relevant node until the next set of calculations are performed, at which point they are overwritten.

The tree data structure 1200 (FIG. 12) allows the analytics engine 315 to slice the building utilization data in meaningful ways chosen by the user and then analyze this sliced data. For example, rooms may be tagged by location such that the user may be able to review occupancy rates of all rooms on first floor of building 102. Similarly, the user may review occupancy rates of rooms of particular sizes, determine whether rooms with VTC technology are utilized, or the like. The analytics engine 315 may slice the data in a variety of ways, as will be later describe, enabling the user to identify which types of rooms have unwanted room utilization characteristics. For example, while a user may observe that total room utilization is at desired levels, slicing the data by the "Purpose" tag might show that VTC room usage is very high—indicating that more rooms need to be equipped with VTC. Each of the various building utilization factors (e.g., occupancy, people count, and device usage) may be considered individually and further sliced by various tags. Each factor may be associated with its own best building utilization practices towards which the building utilization system would guide users to aim.

Finally, in step 412, the building management server 110 displays a visualization of the building utilization data via the frontend engine 319. The frontend engine 319 presents room utilization data to the end user and allows uses to explore the data in a simple, uncluttered, and meaningful way.

FIG. 14 illustrates a schematic diagram depicting a frontend page 1400 illustrating a visualization of the building utilization data according to an embodiment. According to an embodiment, the frontend page 1400 may comprise four main areas including: a top navigation bar 1401, an upper alerts area 1402 displaying any urgent messages, a mid-level building utilization visualization area 1403 displaying the current data visualization including various tools to interact with it, and a list of visualized space nodes 1404, such as a "Room List", listing rooms that are currently being displayed in the graph including controls for interacting with them directly.

The building utilization visualization area 1403 can display a gauge, a bar graph, a line graph, or the like. According to an embodiment, initially, the frontend page 1400 renders building utilization overview via a gauge 1405. The gauge 1405 may be used to present a summary of a single measurement (e.g., an average of total node calculations from analytics engine 315) in a way that allows a large amount of information to be displayed in a single visualization. The user may use the "Overview" drop down menu 1421 to select to view overview data of a particular campus or building (i.e., root nodes) where the building management system is monitoring utilization for multiple campuses or buildings. In the example of FIG. 14, an overview of "All" data is selected and displayed. Additionally, the user may select which building utilization data to display from the "Explore" drop down menu 1422. The user may select to explore "Occupancy" data, "Device Usage" data, "People Count" data, or the like. In the example of FIG. 14, an overview of "Occupancy" data is selected. "All" and "Occupancy" data may be selected as a default.

Accordingly, in the example of FIG. 14, the gauge 1405 will show the total occupancy rate for the entire facility. To calculate this measurement, the analytics engine 315 may calculate an average of all the normalized occupancy data for the facility. The gauge 1405 may comprise a ring user interface ("UI") element 1407 that may indicate an ideal measurement area 1408 in green, acceptable measurement areas 1409 in yellow, and unwanted measurement areas 1410 in red. Preferred limits for these measurement areas may be set by the user. For example, preferred measurements for occupancy may comprise an ideal measurement of 60% to 85%, acceptable measurements of 55% to 60% and 85% to 90%, and unwanted measurements of 0% to 55% and 90% to 100%.

Calculations for actual building utilization may be shown using three items: a central meter 1412 that shows the average of the measurement, and a minimum side arrow 1414 and maximum side arrow 1415 that show the maximum and minimum nodes of the measurement. The side arrows 1414 and 1415 allow the user to ensure that the full range of calculations fall within acceptable bounds. For example, the central meter 1412 in gauge 1405 of FIG. 14 illustrates that rooms are occupied 70% on average. While the average measurement may be within the ideal measurement area 1408, the side arrows 1414 and 1415 show that there are some rooms (i.e., space nodes) that have unwanted occupancy measurements. There may be a space node with the lowest occupancy rating of 35% as indicated by arrow 1414 and a space node with the highest occupancy rating of 95% as indicated by arrow 1415. In response the end user may further explore the data and make adjustments on how these rooms are utilized.

The room list 1404 lists the rooms currently being displayed in the building utilization visualization area 1403. In FIG. 14, since "All" rooms are selected, the room list 1404 lists all the rooms that are being monitored by the building management system. For each room, the room list 1404 may list associated information and tags, including the room name, the building it is located at, its address, the floor, the department it belongs to, its access level, capacity, purpose, or the like. The user may review room specific information by clicking the "Show" button 1426 next to the selected room. The user may further add an alert for a particular room, as will be further described, by pressing on the "Add Alert" button 1427 next to the selected room.

The user may further explore the data by choosing to break up the data by a selected tag's states via the break down bar 1424. The break down bar 1424 may comprise dropdown menus each displaying the name of a tag. For example, the break down bar 1424 may comprise the following drop down menus: Campus 1206*b*, Building 1206*c*, Floor 1206*d*, Department 1206*e*, Room 1206*a*, Capacity 1206*f*, Access 1206*g*, Purpose 1206*h*, or the like. A selection of particular tag from the break down menu 1424 is configured for causing the analytics engine 315 to split the occupancy data records by the tag's states into sets of occupancy data records. Additionally, clicking on a drop down menu, such as the "Room" 1206*a* drop down menu, may reveal various ways how the tag may be graphed. For example, the tag may be graphed using a bar graph 1434 that compares a rolling average of the measured quantity across tag states. Selecting bar graph 1434, causes the analytics engine 315 to first split the occupancy data records by the tag's states into sets of occupancy data records, and for each split set of occupancy data records, calculate an occupancy rate (e.g., calculate an average for each split set of occupancy data records). The break down bar 1424 may be visible below the currently displayed graph, showing all the ways the current graph can be broken down further.

The tag may also be graphed using a line graph 1432 that compares the tag states over time. Selecting line graph 1432, causes the analytics engine 315 to first split the occupancy data records by the tag's states into sets of occupancy data records, and for each split set of occupancy data records, calculate an occupancy rate (e.g., calculate averages for each split set of occupancy data records over time).

For example, a user may select the line graph 1432 from the "Room" tag 1206a in the break down bar 1424. This will cause the frontend page 1400 to display a line graph 1501 as illustrated in FIG. 15. The line graph 1501 may compare all of a tag's states over time, averaged for each of the values along the x-axis of the graph 1501. In the example shown in FIG. 15, the line graph compares occupancy rate between each room over half-hour intervals. Each room or state is represented as a line, e.g., state line 1504, that illustrates changes in occupancy rates over the time of day. Generally, to further explore the data, the user may click on one of the states 1504 (i.e., a line for one of the rooms) on the graph to select only that tag's state and then select another tag in the break down bar 1424.

According to an embodiment, clicking on the state line 1504 for conference room 101 in line graph 1501 shown in FIG. 15 may display only that line 1504 for conference room 101. Since the occupancy data for conference room 101 is singular and cannot be further broken down, the break down bar 1424 may contain no additional tags. The list of visualized space nodes 1404 may also display only information for conference room 101. The user may click on the "Reset" button 1502 to return to FIG. 14 to further evaluate the data.

Referring back to FIG. 14, the user may then select a bar graph 1434 under the "Building" tag 1206c in the break down bar 1424. This will cause the frontend page 1400 to display a bar graph 1601 as illustrated in FIG. 16. The bar graph 1601, rather than showing measurements over time like the line graph 1501, shows them averaged into a single measurement with each bar representing a single tag state. For example, each bar in bar graph 1601 of FIG. 16 represents average occupancy rates of a building. For example, rooms in building 102 are occupied on average 25%, while rooms in building 2 are occupied on average 31%.

Like the line graph, a user may click on a single bar to explore the data for that state further. In the example of FIG. 16, the user may select a building and break occupancy data for the selected building further by floors 1206d, departments 1206e, rooms 1206a, capacity 1206f, access 1206g, purpose 1206h, or the like. For example, the user may click on bar 1602 representing building 102 and select a bar graph 1434 under the "Room" tag 1206a to further explore occupancy rates of individual rooms located in building 102. This will cause the frontend page 1400 to display bar graph 1701 as illustrated in FIG. 17, where each bar represents average occupancy rate of a room located in building 102. For example, conference room 101 is occupied on an average around 24%. Generally, the data may be explored further by clicking on a single bar and selecting another tag. However, since each bar represents occupancy data for a single room, the data cannot be further broken down, and the break down bar 1424 may contain no additional tags. Again, the user may click on the "Reset" button 1502 to return to FIG. 14 to further evaluate the data using different node and tag splits.

For example, the user may select to overview occupancy data in building 102 in the "Overview" drop down menu 1421, and select a bar graph 1434 under the "Floor" tag 1206d in the break down bar 1424, which will display a bar graph comparing occupancy rate by floor in building 102. Alternatively, the user may select a bar graph 1434 under the "Department" tag 1206e in the break down bar 1424, which will display a bar graph comparing occupancy rates by departments. The user may select a bar graph 1434 under the "Capacity" tag 1206f in the break down bar 1424, which will display a bar graph comparing occupancy rates by room size. The user may select a bar graph 1434 under the "Access" tag 1206g in the break down bar 1424, which will display a bar graph comparing occupancy rates of rooms of different access level (e.g., a bar showing occupancy for "open" state rooms, a bar showing occupancy for "manager" state rooms, and a bar showing occupancy for "restricted" state rooms). Finally, the user may select a bar graph 1434 under the "Purpose" tag 1206h in the break down bar 1424, which will display a bar graph comparing occupancy rates of rooms containing different types of equipment (e.g., a bar showing occupancy for "presentation" rooms, a bar showing occupancy for "ATC" rooms, and a bar showing occupancy for "VTC" room). In response to a selection of each tag, the analytics engine 315 splits the measurement data along the selected tag's states and graphs the data with each graph element representing a tag state. The user may then select one of the displayed bars or lines in the graph to further split the data along a desired tag.

The following sections describe example use cases of a user utilizing the building management system 100 of the present embodiments:

Case 1: Employee Complaints:

Tim is a facilities manager for a single building at a mid-sized corporation with multiple locations. He has received numerous complaints that there are no rooms available for meetings in building 102. He opens up the frontend page 1400, selects "Building 102" under the "Overview" drop down menu 1421, and observes that total utilization in building 102 is less than 50% and falls right within his target guidelines—but that there is a very wide spread between his most occupied and least occupied rooms (i.e., as indicated by side arrows 1414 and 1415). He clicks on the "Building" tag 1206 in the break down bar 1424 and selects the line graph 1432 to view the utilization of building 102 over time and sees that total utilization peaks at 10:30 AM and 3:00 PM at approximately 80%, a rate high enough that people are certainly being blocked on some days. He then selects the "Access" tag 1206g in the break down bar 1424 to view the difference in utilization of rooms between manager-only access and open-access rooms. He sees that manager-level room utilization hovers around 20% even at peak times. Tim decides to speak to the managers in building 102 about opening access to their limited access rooms and to submit slides to the corporate digital signage system to suggest off-peak times to hold meetings.

Case 2: Planning a New Office:

Margaret is a new hire real estate manager for a mid-sized corporation with multiple locations. The company is growing, the lease is up on the current New Jersey office (e.g., building 102), and her first assignment is to plan the new office. The company has standardized on four conference room styles—small presentation, large presentation, small VTC, and large VTC. The old office had these four configurations in equal proportion but Margaret wants to know if that is the best use of resources. She opens the frontend page 1400, selects "Building 102", and selects the bar graph 1434 under the "Capacity" tag 1206f to view occupancy rate by size. In response, the bar graph 1434 may display three bars indicating the average occupancy rate of small-sized conference rooms, mid-sized conference rooms, and large-sized conference rooms. She observes that small conference rooms have an occupancy rate and are in use 70% of the work day, whereas large conference rooms are only used 30% of the work day. She then selects to further evaluate the small-sized conference rooms by clicking on the bar in the bar graph representing the small-sized conference room. Digging further, she selects the "Purpose" tag 1206h in the break down bar 1424 and finds that small VTC rooms are occupied 90% of the time while small presentation rooms are occupied 50% of the time. Exploring along different splits and finding all other factors to be equal, Margaret plans to have a greater proportion of small VTC rooms in the new office plan.

Case 3: Long-Term Efficiency Tracking

John is the facility manager for a pharmaceutical company's headquarter (e.g., Building 102). The building has many conference rooms in many configurations—some are VTC, some support audio conferences ("ATC"), some just have screens for presentations. They are also in a variety of capacities. Different teams—marketing, sales, R&D, etc.—are in different sections of the building and have access to different conference rooms, just based on what is nearby. All of the building's rooms are controlled by a building control system 106. John wants to know if the conference rooms are distributed correctly for how each team uses them. John opens the frontend page 1400, selects "Building 102", and selects "Device Usage" measurement from "Explore" drop down menu 1422 to see how well each room's usage matches its equipment. He then selects the bar graph 1434 under the "Purpose" tag 1206h in the break down bar 1424. He observes that VTC equipment is only utilized 40% of the time in rooms that contain it. He clicks on a bar representing VTC rooms on the graph to hide all other rooms, then selects to break down VTC rooms by the "Department" tag 1206e in the break down bar 1424. He observes that marketing uses VTC in their rooms 80% of the time but R&D only uses it 20%. The two departments are next to each other so he considers swapping some of R&D's VTC rooms with some of marketing's presentation rooms.

Later in the day, John wants to know if room sizes are allocated correctly. He opens the frontend page 1400, but this time he selects to view the room population measurement, or the "People Count" measurement, in the "Explore" drop down menu 1422. He then splits the data by department by selecting the "Department" tag 1206e in the break down menu 1424. He observes that legal is only using 20% of the capacity of their large conference rooms. Looking at legal department's average room population, he sees that they average 3 people in a meeting with a range of 2 to 8, but they have two 20-person conference rooms allocated to them. John decides to swap the 20-person conference rooms with marketing's 8-person conference rooms, which are typically at or over capacity.

According to another or additional embodiments, a user may create and monitor "Alerts". To that end, the alert engine 317 of the building management server 110 allows the user to input maximum and minimum values for measurements and calculations from the analytics engine. These can take two forms: either a maximum/minimum rolling average or a maximum rate of change over a period of time. Multiple alerts can be created for a single measurement and alerts can be applied to either a single space node or to a tag state. The alert engine 317 will monitor the calculations from the analytics engine regularly and will issue alerts as they are necessary.

Tag state alerts can be applied to aggregate measurements of the space nodes. For example, an aggregate alert for occupancy below 40% in building 102 would trigger if the total occupancy rate of all of the rooms in building 102 fell below 40%, but not if a single room in 22 Link fell below 40%. In another embodiment, tag state alerts can be applied in an inherited case where the alert would apply to all nodes with that state (and nodes with states below the alerted state in the tag state hierarchy) except when the node has a conflicting alert of its own. For example, choosing a "Room" tag will trigger a new alert for each room below 40% in building 102.

Referring to FIG. 14, a user may create an alert for a single node by clicking on "Add Alerts" button 1427 in the room list area 1404. A user may also create alerts by clicking the "Add Alert" button 1445 in the building utilization visualization area 1403. In response, a pop-up window may be displayed where the user may input minimum/maximum values. Such an alert will be applied to the current location within the data organization tree displayed in the building utilization visualization area 1403 as navigated by the user. For example, since building utilization visualization area 1403 displays a gauge 1405 that applies to occupancy rate of the entire monitored facility, clicking on the "Add Alert" button 1445 will add an alert that will monitor maximum/minimum occupancy levels for the entire monitored facility. If the current display on the screen is room occupancy from a single building as split by access level, the added alert will apply for rooms in that building or aggregate alerts for access level.

Alternatively, alerts may be created in a dedicated alert page accessed via the "Alerts" tab 1440 configured for allowing a user to select a node or a tag, select the type of alert (maximum, minimum, or maximum rate of change), enter a boundary value, and save the alert. In response, the data structuring engine 314 selects corresponding node or tag state, and the alert engine 317 creates and saves the alert. The alert engine 317 then monitors the associated calculations from the analytics engine 315. Any normalized data update may trigger the analytics engine 315 to recalculate measurements. The alert engine 317 may check the analytics engine 315 after each recalculation. When the specified a maximum, minimum, or maximum value is exceeded, the alert engine 317 will issue a new alert.

Triggered alerts can be issued via visual box 1402 on the frontend page 1400, email, or text message. For example, alerts in the alerts area 1402 may comprise distinct user interface ("UI") elements in the form of messages that appear whenever data at or higher in the hierarchy than the alert's node is displayed on the screen. Each alert message may show the name of the alert's node (e.g., "Building 102"), the name of the measurement in violation (e.g., utilization), the set boundary (e.g., "minimum of 65%"), and the calculated value of the measurement (e.g., 25%). When an alert is issued, the user may click on an "Explore" button 1436 to explore the data that has triggered the alert, "Change Limit" button 1437 to change the alert criteria, or "Ignore" button 1438 to ignore the alert. According to an embodiment, when issued via visual box 1402 on the frontend page 1400, only alerts that apply at the current location within the data organization tree displayed in the building utilization visualization area 1403 will be shown. For example, if the current display on the screen is room occupancy from a single building as split by access level, only alerts for the rooms in that building or aggregate alerts for access level will be shown. If more than four alerts are active at a time, the four highest up in the hierarchy at or below the currently displayed level in the hierarchy may be shown, with an additional message indicating how many other alerts are active paired with a link to a dedicated alert page. The dedicated alert page accessed via the "Alerts" tab 1440 may show all existing alerts—active or inactive—organizable and sortable by column.

The following is an exemplary use case for alerts:

Case 4: Alerts:

Jill is the real estate manager at a rapidly growing, venture capital funded startup in San Francisco. She knows that her company will soon outgrow the meeting space in the current office building (e.g., building 102) and is looking for additional room, but is unsure of how the new hiring will impact conference room usage and therefore is not sure when a new office will be needed. She wants to have the confidence to play hardball in getting a good office with good lease terms, but does not want to end up overcrowding her current office. She opens the frontend page 1400 and sets up alerts on total room occupancy so that if room usage passes 75% or if the change in room usage increases considerably, she will know right away that she needs to find new office space now. Two months later she receives an email from the building management server 110 telling her that occupancy is now 76%.

INDUSTRIAL APPLICABILITY

To solve the aforementioned problems, the aspects of the embodiments are directed towards systems, methods, and modes for determining building utilization for building control and management. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described as being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

In addition, the above disclosed methods are not meant to limit the aspects of the embodiments, or to suggest that the aspects of the embodiments should be implemented following the aforementioned methods. The purpose of the aforementioned methods is to facilitate the understanding of one or more aspects of the embodiments and to provide the reader with one or many possible implementations of the processed discussed herein. It should be understood by one of ordinary skill in the art that the steps of the aforementioned methods may be performed in a different order and that some steps may be eliminated or substituted.

All United States patents and applications, foreign patents, and publications discussed above are hereby incorporated herein by reference in their entireties.

Alternate Embodiments

Alternate embodiments may be devised without departing from the spirit or the scope of the different aspects of the embodiments.

What is claimed is:

1. A method for determining space utilization in a building comprising the steps of:
   retrieving raw occupancy data records from a raw data database, wherein the raw occupancy data records are gathered from a plurality of room utilization sensors, wherein the plurality of room utilization sensors include occupancy sensors each configured for detecting an occupancy state in a room in a building, wherein each raw occupancy data record comprises an occupancy state associated with a timestamp;
   normalizing the raw occupancy data records into normalized occupancy data records, wherein each normalized occupancy data record comprises a time segment and an occupancy state indicating whether for a given time segment a room is occupied;
   structuring the normalized occupancy data records by associating each normalized occupancy data record with a space node corresponding to a room in the building from where the raw occupancy data record was collected;
   associating each space node with a set of tags, each tag defining a single state from a plurality of states;
   receiving a selection of a tag from a user interface;
   splitting the normalized occupancy data records along the selected tag's states into sets of normalized occupancy data records;
   for each split set of occupancy data records, calculating at least one occupancy rate; and
   displaying a visualization of space utilization of the building comprising a comparison of the occupancy rates of the selected tag's states.

2. The method of claim 1, wherein each space node is organized in a tree topology with a building node as the root and individual space nodes as children.

3. The method of claim 1, wherein the occupancy rates comprise averages of the split sets of occupancy data records, wherein the visualization of space utilization of the building comprises a bar graph comprising bars that compare the occupancy rates.

4. The method of claim 1 further comprising the steps of:
   receiving a selection of a first bar from the user interface corresponding to a first set of normalized occupancy data records;

receiving a selection of a second tag from the user interface;

further splitting the first set of normalized occupancy data records along the selected second tag's states into subsets of normalized occupancy data records;

for each split subset of occupancy data records, calculating at least one second occupancy rate; and displaying a second visualization of space utilization of the building comprising a comparison of the second occupancy rates of the selected second tag's states.

5. The method of claim 1, wherein the occupancy rates comprise changes of averages of the split sets of occupancy data records across time segments, wherein the visualization of space utilization of the building comprises a line graph comprising lines that compare the occupancy rates over time.

6. The method of claim 5 further comprising the steps of:

receiving a selection of a first line from the user interface corresponding to a first set of normalized occupancy data records;

receiving a selection of a second tag from the user interface;

further splitting the first set of normalized occupancy data records along the selected second tag's states into subsets of normalized occupancy data records;

for each split subset of occupancy data records, calculating at least one second occupancy rate; and displaying a second visualization of space utilization of the building comprising a comparison of the second occupancy rates of the selected second tag's states.

7. The method of claim 1, wherein the raw occupancy data records are normalized by determining for each given time segment whether a total amount of time a room was occupied during the given time segment exceeds a predetermined minimum occupancy threshold value.

8. The method of claim 1, wherein, for each given time segment and for each given space node, the raw occupancy data records are normalized by:

creating a normalized occupancy data record for the given time segment and given space node;

retrieving raw occupancy data records associated with the given space node with timestamps falling between a start time and an end time of the given time segment;

retrieving a last occupancy data record associated with the given space node from a previous time segment;

determining time intervals during which occupancy states of the retrieved raw occupancy data records indicated that a room associated with the given space node was occupied during the given time segment;

adding the time intervals to determine the total time the room was occupied;

determining whether the total time exceeds a minimum occupancy threshold;

when the total time exceeds the minimum occupancy threshold, setting an occupancy state of the created normalized occupancy data record as occupied; and when the total time does not exceed the minimum occupancy threshold, setting the occupancy state of the normalized occupancy data record for the given time segment and given space node as vacant.

9. The method of claim 1, wherein the set of tags comprise at least one of a room name tag, a campus tag, a location tag, a building name tag, a floor tag, a department tag, a team tag, a room capacity tag, a room access level tag, an available resource tag, and a purpose tag.

10. The method of claim 1, wherein the set of tags comprise at least one of a department tag comprising department states each identifying a department, a capacity tag comprising capacity states each identifying a maximum room capacity, and an access level tag comprising access level states each identifying employee access level to a room.

11. The method of claim 1, wherein the set of tags comprise a purpose tag comprising purpose states each identifying a type of meeting that can be held in a room.

12. The method of claim 11, wherein the purpose states comprise at least one of a presentation room state, an audioconference codec room state, and a videoconference codec room state.

13. The method of claim 1 further comprising the step of displaying a building overview gauge comprising:

a bar comprising an ideal measurement area, an acceptable measurement area, and an unwanted measurement area;

a meter that shows on the bar an average occupancy rate of the entire building;

a minimum arrow that shows a minimum average occupancy rate of a space node; and a maximum arrow that shows a maximum average occupancy rate of a space node.

14. The method of claim 1 further comprising the step of issuing alerts when calculated occupancy rates exceed a minimum value or a maximum value.

15. The method of claim 1 further comprising the steps of:

retrieving raw people count data records from the raw data database, wherein the room utilization sensors further comprise people count sensors each configured for counting people in a room, wherein the raw people count data records are gathered from the plurality of people count sensors, wherein each raw people count data record comprises a people count associated with a timestamp;

normalizing the raw people count data records into normalized people count data records, wherein each normalized people count data record comprises a time segment and a people count indicating the number of people present in a room during a given time segment;

structuring the normalized people count data records by associating each normalized people count data record with a space node corresponding to a room in the building from where the raw people count data record was collected;

receiving a selection of a tag from the user interface;

splitting the normalized people count data records along the selected tag's states into sets of normalized people count data records; and for each split set of normalized people count data records, calculating at least one people count rate.

16. The method of claim 15, wherein the raw people count data records are normalized by determining a peak number of people that were present in a room for a predetermined minimum amount of time during a given time segment.

17. The method of claim 15, wherein, for each given time segment and for each given space node, the raw people count data records are normalized by:

(a) creating a normalized people count data record for the given time segment and given space node;

(b) retrieving raw people count data records associated with the given space node with timestamps falling between a start time and an end time of the given time segment;

(c) retrieving a last people count data record associated with the given space node from a previous time segment;

(d) comparing people counts of the retrieved raw people count data records and determining a peak people count indicating a peak number of people that were present in the room during the given time segment;

(e) determining a time interval during which the people counts of the retrieved raw people count data records were equal to or exceeding the peak people count;

(f) determining whether the time interval exceeds a minimum count threshold;

(g) when the time interval exceeds the minimum count threshold, setting a people count of the created normalized people count record to the peak people count; and (h) when the time interval does not exceed the minimum count threshold:
  i. decrementing the peak people count by one;
  ii. when the decremented peak count is not larger than zero, setting the people count of the created normalized people count record to zero;
  iii. when the decremented peak count is larger than zero, repeating steps (e) through (h).

18. The method of claim 1 further comprising the steps of:

receiving raw device usage data records from a plurality of electronic devices installed in the rooms of the building, wherein each device usage record comprises device usage state associated with a timestamp;

retrieving room scheduling data records from a calendar server;

normalizing the raw device usage data records into normalized device usage data records, wherein each normalized device usage data record comprises a time segment and a device usage state indicating whether an electronic device was used during a time segment falling within a scheduled meeting;

structuring the normalized device usage data records by associating each device usage data record with a space node corresponding to a room in the building from where the raw device usage data was collected;

receiving a selection of a tag from the user interface;

splitting the normalized device usage data records along the selected tag's states into sets of normalized device usage data records; and for each split set of normalized people count data records, calculating at least one device usage rate.

19. The method of claim 18, wherein, for each given space node, the raw device usage data is normalized by:

retrieving a scheduled meeting from the calendar server comprising a start time and an end time;

retrieving device usage records with timestamps falling between the start time and end time of the scheduled meeting;

determining whether at least one device usage record has been recorded during the scheduled meeting;

when at least one device usage record has been recorded, for each time segment that falls between the start time and end time of the scheduled meeting, creating a normalized device usage data record and setting its device usage state to indicated that an electronic device has been used; and when no device usage record has been recorded, for each time segment that falls between the start time and end time of the scheduled meeting, creating a normalized device usage data record and setting its device usage state to indicated that an electronic device has not been used.

20. A method for determining space utilization in a building comprising the steps of:

retrieving raw people count data records from a raw data database, wherein the raw people count data records are gathered from a plurality of room utilization sensors, wherein the plurality of room utilization sensors include people count sensors each configured for counting people in a room in a building, wherein each raw people count data record comprises a people count associated with a timestamp;

normalizing the raw people count data records into normalized people count data records, wherein each normalized people count data record comprises a time segment and a people count indicating the number of people present in a room during a given time segment;

structuring the normalized people count data records by associating each normalized people count data record with a space node corresponding to a room in the building from where the raw people count data record was collected;

associating each space node with a set of tags, each tag defining a single state from a plurality of states;

receiving a selection of a tag from a user interface;

splitting the normalized people count data records along the selected tag's states into sets of normalized people count data records;

for each split set of normalized people count data records, calculating at least one people count rate; and displaying a visualization of space utilization of the building comprising a comparison of the people count rates of the selected tag's states.

* * * * *